(12) United States Patent
Peters

(10) Patent No.: US 10,672,308 B2
(45) Date of Patent: Jun. 2, 2020

(54) FRICTION PRODUCING MECHANISM FOR USE WITH A HANGING BANNER AND METHOD OF FORMING SAME

(71) Applicant: Calvin R. Peters, Grandville, MI (US)

(72) Inventor: Calvin R. Peters, Grandville, MI (US)

(73) Assignee: CP Global, LLC, Grandville, MI (US)

(*) Notice: Subject to any disclaimer, the term of this patent is extended or adjusted under 35 U.S.C. 154(b) by 244 days.

(21) Appl. No.: 15/814,809

(22) Filed: Nov. 16, 2017

(65) Prior Publication Data

US 2018/0102075 A1   Apr. 12, 2018

Related U.S. Application Data

(63) Continuation-in-part of application No. 14/567,073, filed on Dec. 11, 2014, now Pat. No. 9,852,668.
(Continued)

(51) Int. Cl.
| | |
|---|---|
| A47B 96/06 | (2006.01) |
| A47G 29/00 | (2006.01) |
| A47K 1/00 | (2006.01) |
| E04G 3/00 | (2006.01) |
| E04G 5/06 | (2006.01) |
| F21V 21/00 | (2006.01) |
| F21V 35/00 | (2006.01) |
| G09F 17/00 | (2006.01) |
| F16B 2/22 | (2006.01) |
| F16B 2/00 | (2006.01) |
| F16B 5/06 | (2006.01) |

(Continued)

(52) U.S. Cl.
CPC .............. *G09F 17/00* (2013.01); *F16B 2/005* (2013.01); *F16B 2/22* (2013.01); *F16B 5/0642* (2013.01); *F16B 5/0664* (2013.01); *F16B 11/006* (2013.01); *G09F 2007/1817* (2013.01); *G09F 2017/005* (2013.01); *G09F 2017/0041* (2013.01)

(58) Field of Classification Search
USPC ....... 248/74.2, 229.16, 229.26, 228.7, 230.7, 248/231.81
See application file for complete search history.

(56) References Cited

U.S. PATENT DOCUMENTS

| | | |
|---|---|---|
| 3,272,463 A | 9/1966 | Greig |
| 4,340,199 A | 7/1982 | Brock |

(Continued)

*Primary Examiner* — Terrell L McKinnon
*Assistant Examiner* — Michael McDuffie
(74) *Attorney, Agent, or Firm* — Frank M. Scutch, III

(57) ABSTRACT

An apparatus and related methods includes a base attached to an upright structure (such as a street light pole), a mounting bracket that releasably engages the base while supporting a hanging banner, and an install adapter that releasably holds the mounting bracket and banner until the mounting bracket attaches to the base. A removal adapter facilitates disengaging the mounting bracket and banner from the base. The mounting bracket and install adapter (and removal adapter) are attached to a pole and engage (and disengage) remotely and without using separate fasteners, thus allowing a worker to install (or remove) banners high on the upright structure while standing on the ground. The base and mounting bracket have tapered shapes that wedgingly engage, secured by a spring-biased friction retainer. The install adapter and removal adapter have structures that facilitate remote install and removal of the mounting bracket from the base.

18 Claims, 29 Drawing Sheets

Related U.S. Application Data

(60) Provisional application No. 61/924,910, filed on Jan. 8, 2014.

(51) Int. Cl.
*F16B 11/00* (2006.01)
*G09F 7/18* (2006.01)

(56) References Cited

U.S. PATENT DOCUMENTS

| | | | |
|---|---|---|---|
| 4,864,962 A * | 9/1989 | Kuehl | E04H 12/32 116/174 |
| 4,880,195 A | 11/1989 | Lepley | |
| 5,188,332 A | 2/1993 | Callas | |
| 5,267,764 A | 12/1993 | Hoffman | |
| 5,381,991 A | 1/1995 | Stocker | |
| 5,388,794 A | 2/1995 | Wolff | |
| 5,463,973 A | 11/1995 | Tait | |
| 5,632,519 A | 5/1997 | Stock | |
| 5,709,057 A | 1/1998 | Johnson, Jr. | |
| 5,759,121 A | 6/1998 | Rogers | |
| 5,938,255 A | 8/1999 | Rose | |
| 6,193,436 B1 | 2/2001 | Ellis | |
| 6,378,820 B1 | 4/2002 | Mooney et al. | |
| 7,429,067 B1 | 9/2008 | Rosa | |
| 7,758,217 B2 * | 7/2010 | Hsu | G02F 1/133608 248/541 |
| 7,810,265 B2 | 10/2010 | Beatty | |
| 8,641,110 B1 | 2/2014 | Perry | |
| 2003/0010274 A1 | 1/2003 | McCudden | |
| 2003/0098403 A1 * | 5/2003 | Fox | G09F 17/00 248/538 |
| 2003/0136806 A1 * | 7/2003 | Mainetti | A47G 25/28 223/85 |
| 2004/0004164 A1 * | 1/2004 | Chen | F16L 3/04 248/74.2 |
| 2005/0160648 A1 * | 7/2005 | Voluckas | G09F 7/20 40/617 |
| 2010/0146832 A1 * | 6/2010 | Gimpel | G09F 11/21 40/604 |
| 2012/0111259 A1 * | 5/2012 | Swisher | G09F 17/00 116/173 |
| 2013/0187018 A1 | 7/2013 | Canfield | |
| 2013/0206938 A1 | 8/2013 | Clouser | |
| 2014/0014024 A1 * | 1/2014 | Schroeder | G09F 17/00 116/173 |
| 2014/0090282 A1 * | 4/2014 | Sedliacik | G09F 17/00 40/666 |
| 2014/0299722 A1 * | 10/2014 | Sampson | F16L 3/1058 248/74.2 |
| 2014/0373771 A1 * | 12/2014 | Woollett | G09F 17/00 116/173 |
| 2015/0310779 A1 | 10/2015 | Raymond, III | |
| 2016/0203741 A1 | 7/2016 | White | |
| 2017/0110039 A1 * | 4/2017 | Jenkins | G09F 17/00 |

* cited by examiner

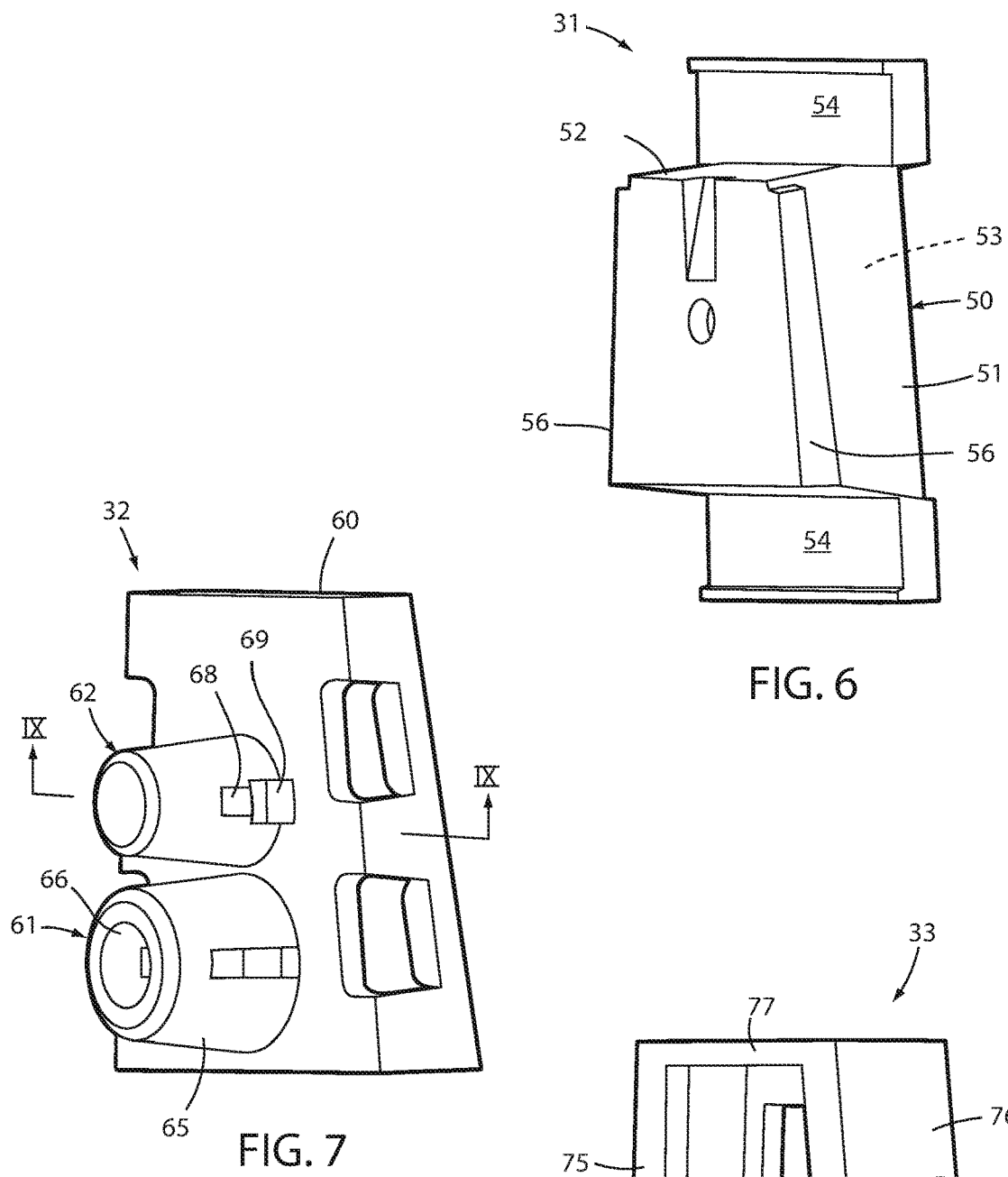
FIG. 6
FIG. 7
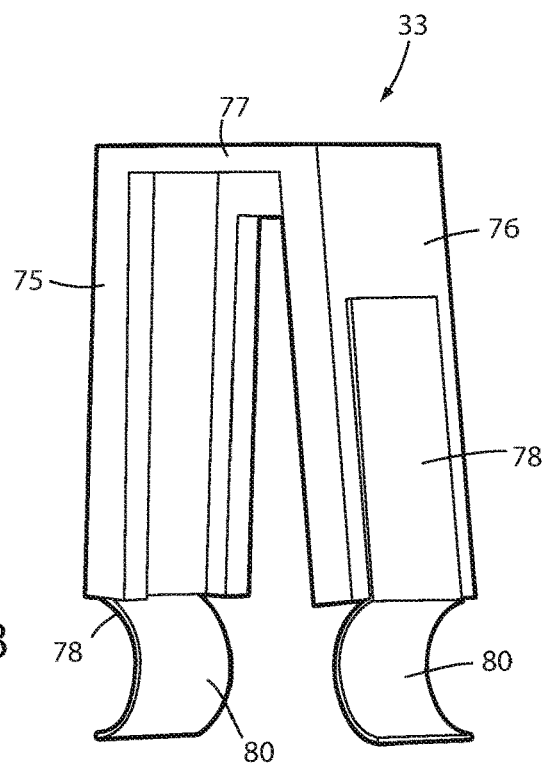
FIG. 8

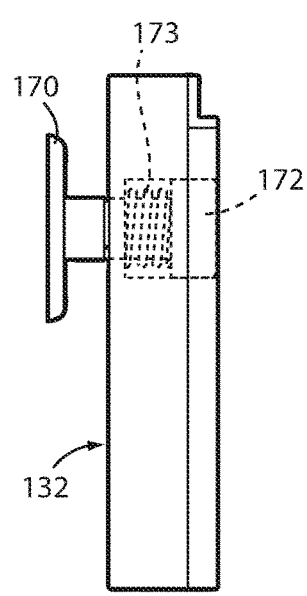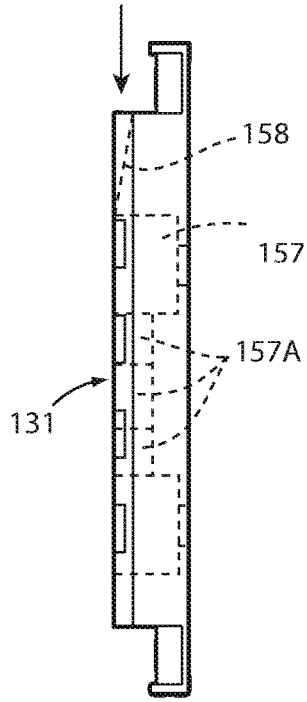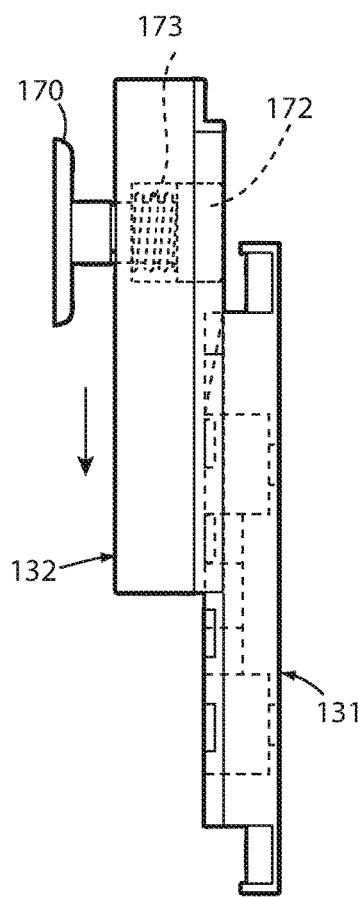
FIG. 29
FIG. 30
FIG. 31

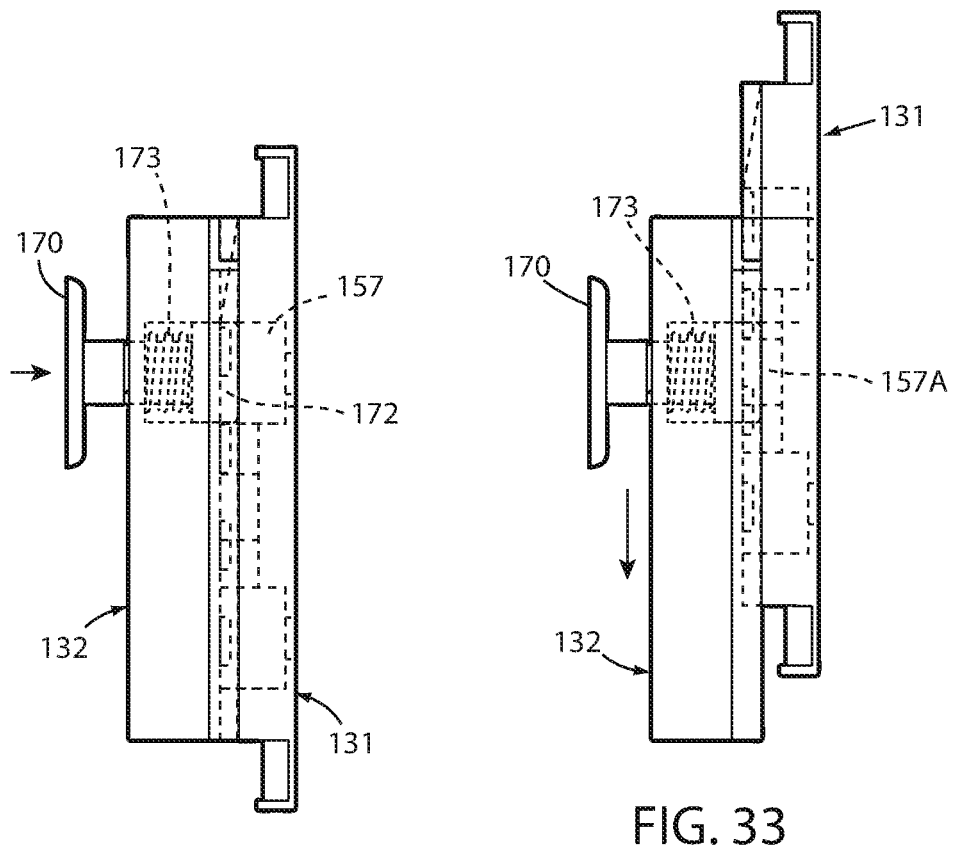
FIG. 32
FIG. 33
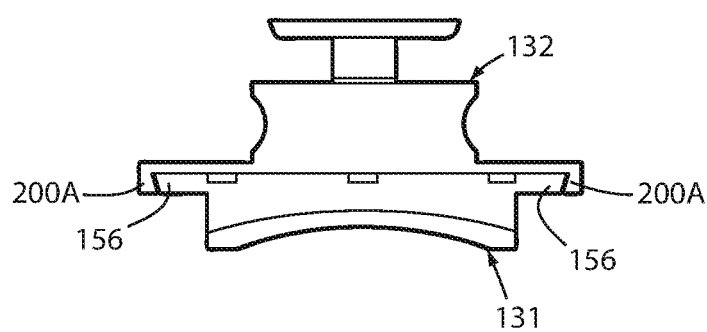
FIG. 34

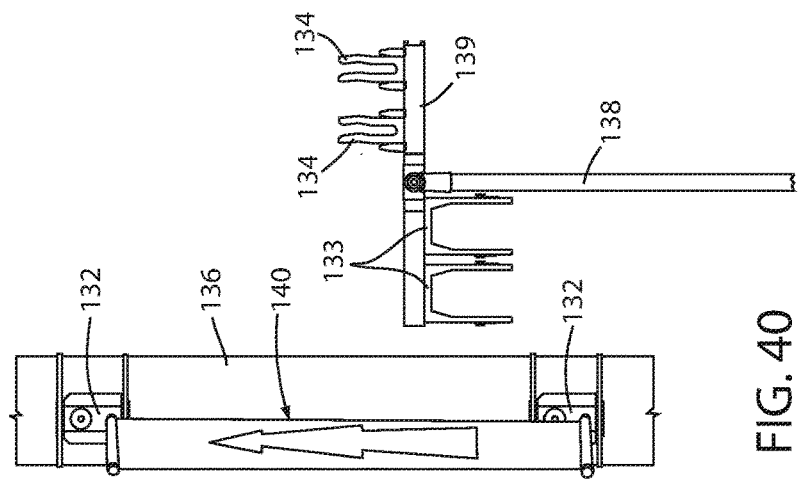
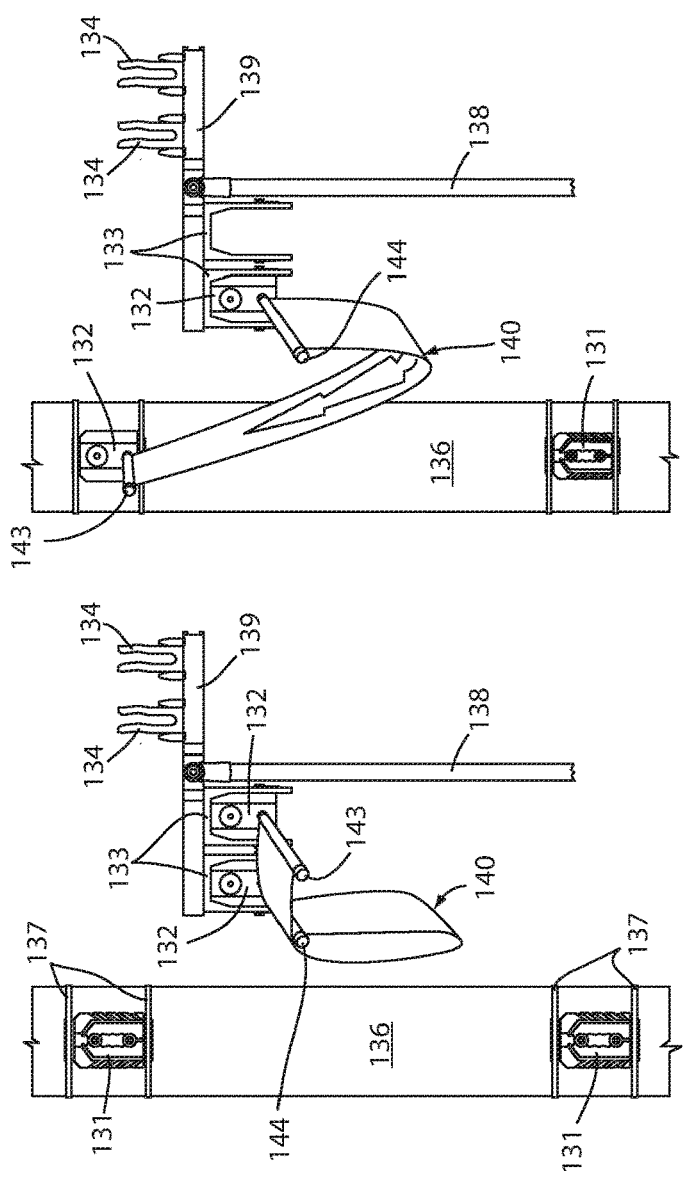
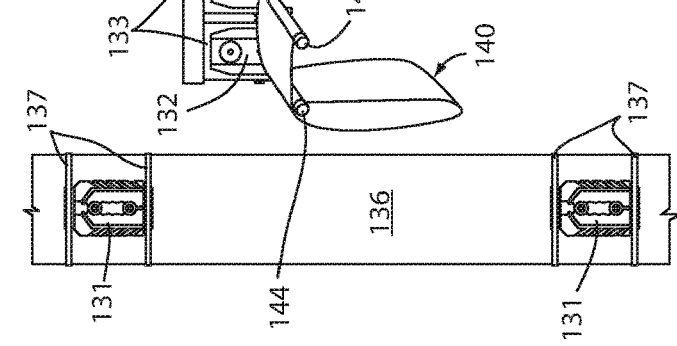
FIG. 40
FIG. 39
FIG. 38

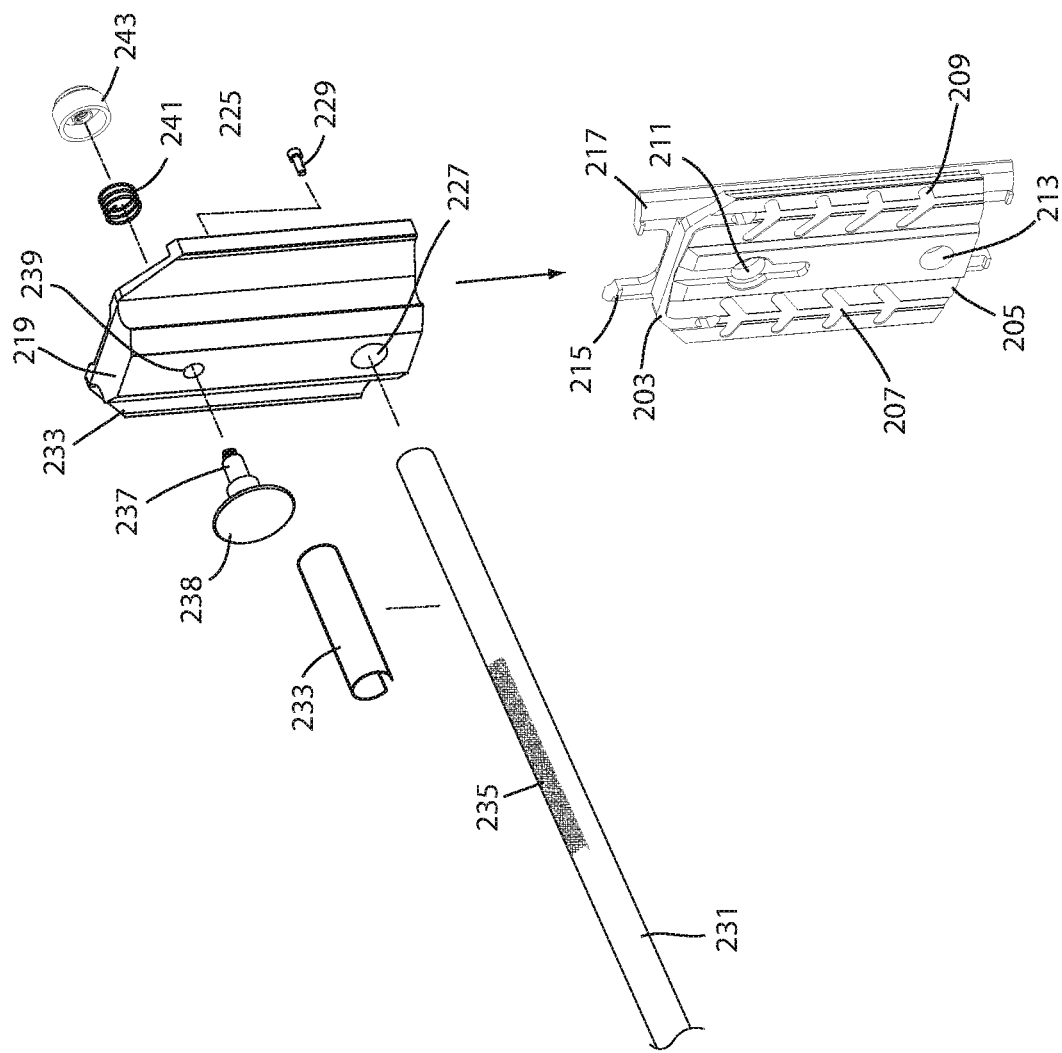

FRICTION PRODUCING MECHANISM FOR USE WITH A HANGING BANNER AND METHOD OF FORMING SAME

FIELD OF THE INVENTION

The present invention relates generally to a banner hanging apparatus and more particularly to an adjustable bracket used with a banner for providing tension between ends of the banner while hanging from a pole.

BACKGROUND

The present invention relates a flag and banner hanging apparatus and methods, and more particularly relates to an apparatus and method for hanging seasonal flags/banners that allows the installer/remover to stand on the ground while installing/removing flags from their mounting brackets.

Many entities hang flags and banners (hereafter generally referred to as "banners") from posts, poles, buildings and other upright structures. The reasons are varied, and range from improving the appearance of city streets, to advertising, to promoting team products and activities, to celebrating holidays and special events. Known systems for hanging the flags and banners require that the installer/remover be at a height of the flag/banner in order to attach (or detach) the flag/banner to mounting brackets. For example, see FIG. 43 which illustrates one method in prior art. Also, ladders and other means can be used.

However, known prior art methods and apparatus are less efficient than desired, require considerable man-power and capital equipment, and require effort to make them safe and to limit liability during installation/removal. Also, known prior art methods and apparatus often tend to unacceptably require disruption of traffic flow during installation/removal. For example, the illustrated method of FIG. 43 lifts a worker high in the air by a utility lift truck with personnel basket, but is relatively costly (since it requires a lift truck or other expensive capital equipment), less safe than desired (since the worker is lifted high above ground, and potentially in close proximity to high voltage electricity), cumbersome (since the connection often requires separate bolts/zip-ties/or/fasteners), is labor intensive, and requires that the adjacent area be temporarily roped off or closed (so that pedestrians and/or vehicles don't pass under the worker) and/or that parking meters/spaces be hooded and/or paid for in advance of the banner installation, adding significantly to the expenses. An improvement is desired that provides savings/improvements in terms of cost, capital investment, efficiency of install and removal, and safety. Also, an improvement is desired that potentially eliminates the need for traffic engineering services while working from a road right of way to install or remove the banners/flags.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 6-8 are perspective views of the base, mounting bracket and install adapter, respectively, from FIG. 4, which, in combination, eliminate a need for separate loose fasteners and that allow the installation to be done from a remote (ground) position.

FIGS. 29-32 are side views showing installation of the mounting bracket onto a mating base (see FIGS. 17-18), FIG. 32 showing the mounting bracket locked at a top locked position on the base.

FIG. 33 is a side view similar to FIG. 32, but showing that during installation, the mounting bracket can be adjusted to a lower locked position on the base.

FIG. 34 is a horizontal cross section through FIG. 32 (or FIG. 33) showing a relationship of the mounting bracket to the base, including sliding engagement of mating flanges.

FIGS. 38-40 are views similar to FIGS. 1-3, but showing the modified attachment system of FIGS. 17-18, 35, FIG. 38 showing pre-install positions, FIG. 39 showing a top mounting bracket installed on a pole-attached base but showing the bottom mounting bracket still attached to the installer adapter on the pole tool, and FIG. 40 showing a fully attached banner with top and bottom mounting brackets attached to spaced-apart bases on the street light pole.

FIG. 44 is a front exploded view illustrating an upper adjustable bracket assembly.

Figure 3:
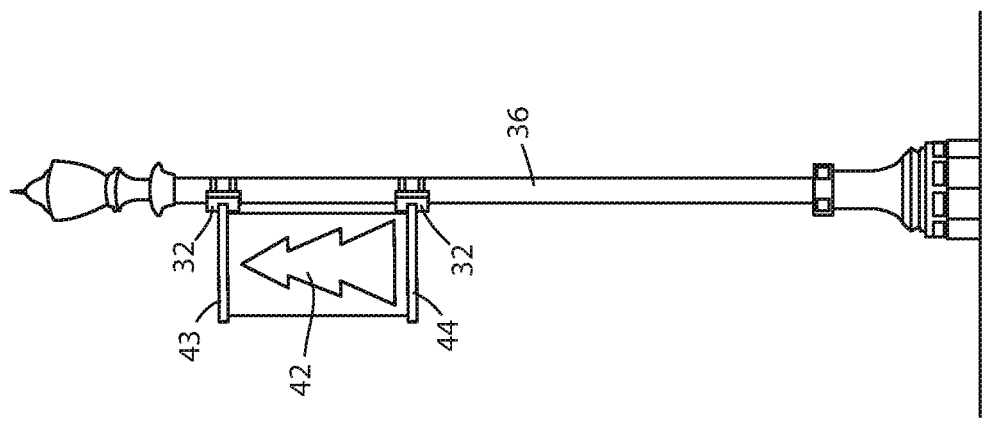
FIGS. 2-3 are elevational views similar to FIG. 1, but FIG. 2 shows the top mounting bracket attached to the top base (with the install adapter and second bracket/banner slightly lowered), and FIG. 3 showing both the top and bottom mounting brackets attached to respective bases on the pole (with the pole and install adapter completely pulled away).

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

SUMMARY OF THE INVENTION

In one aspect of the present invention, an apparatus for hanging a banner on an upright structure, comprises a base configured for attachment to the upright structure; a mounting bracket constructed to releasably engage the base while supporting the banner; and an install adapter constructed to releasably carry the mounting bracket but that releases when the mounting bracket is secured to the base.

In another aspect of the present invention, an apparatus for removing a banner hung on an upright structure, comprises a base configured for attachment to the upright structure; a mounting bracket engaging the base and supporting the banner; and a removal adapter constructed to engage the mounting bracket and release the mounting bracket from the base. The base, mounting bracket, and removal adapter are constructed to engage and disengage without using separate loose fasteners.

In another aspect of the present invention, an apparatus comprises an upright structure and a pair of bases attached to the upright structure; a banner assembly including a banner and a pair of mounting brackets constructed to releasably engage the bases while supporting the banner in a hanging position; and an installation tool including a pole and at least one install adapter attached atop the pole that is constructed to releasably hold the mounting bracket but then release when the mounting bracket becomes secured to the base.

In another aspect of the present invention, an apparatus for hanging a banner on an upright structure, comprises a base having first flanges to receive a band retainer for attaching the base to the upright structure and having second flanges defining a bracket-holding cavity; a mounting bracket having a mating portion shaped to wedgingly fit into the bracket-holding cavity and having a friction-generating retainer for holding the mounting bracket to the base, the mounting bracket also having a rod-supporting structure for supporting a banner-carrying rod; and an install adapter constructed to hold the mounting bracket during installation into the bracket-holding cavity, and constructed to then release the mounting bracket.

In another aspect of the present invention, a method for hanging a banner on an upright structure, comprises providing a base configured for attachment to the upright structure; providing a mounting bracket constructed to releasably engage the base while supporting the banner; providing an install adapter constructed to releasably hold the mounting bracket and then release when the mounting bracket is secured to the base; attaching the mounting bracket to install adapter and then using the install adapter to install the mounting bracket to the base without using separate fasteners; and disengaging the install adapter from the mounting bracket.

In another aspect of the present invention, a method for installing a banner hung on an upright structure, comprises providing a base, and a banner-carrying mounting bracket adapted to engage the base; and using a pole-mounted install adapter to engage the mounting bracket, then cause the mounting bracket to engage the base without using separate loose fasteners, with the install adapter releasing the mounting bracket after the mounting bracket is attached to the base.

In another aspect of the present invention, a method for removing a banner hung on an upright structure, comprises providing a base and a banner-carrying mounting bracket attached to the base; and using a pole-mounted removal adapter to engage the mounting bracket and cause the mounting bracket to disengage from the base without using separate loose fasteners.

In another aspect of the present invention, a method for hanging a banner on an upright structure comprises providing a base configured for attachment to the upright structure, providing a mounting bracket constructed to releasably engage the base while supporting the banner, providing an install adapter constructed to releasably hold the mounting bracket and then release when the mounting bracket is secured to the base, and attaching the mounting bracket to install adapter and then using the install adapter to install the mounting bracket to the base, and thereafter disengaging the install adapter from the mounting bracket, doing so remotely and without using separate fasteners.

In another aspect of the present invention, a method for removing a banner hung on an upright structure, comprises providing a base configured for attachment to the upright structure, providing a mounting bracket constructed to releasably engage the base while supporting the banner, providing a removal adapter constructed to engage the mounting bracket and release the mounting bracket from the base, and using the removal adapter to first engage the mounting bracket and then further using the removal adapter to cause the mounting bracket to disengage from the base, doing so remotely and without using separate fasteners.

In another aspect of the present invention, a method includes attaching at least one base to an upright structure, providing a banner assembly including a flexible banner and at least one mounting bracket, providing an installation tool including a pole and at least one install adapter attached atop the pole, using the installation tool to releasably engage the at least one mounting bracket with the base while supporting the flexible banner in a hanging position, and thereafter releasing the installation tool from the at least one mounting bracket when the mounting bracket becomes secured to the base.

In another aspect of the present invention, a method comprises providing a base having first flanges to receive retainer fasteners for attachment to the upright structure and second flanges defining a tapered cavity, providing a mounting bracket having a mating tapered portion shaped to wedgingly fit into the tapered cavity and having a friction-generating retainer for holding the mounting bracket to the base and also having a horizontal rod-supporting structure for supporting the banner on a rod that engages the rod-supporting structure, providing an install adapter constructed to hold the mounting bracket and then release the mounting bracket as the mating tapered portion fits into the tapered cavity, manipulating the mounting bracket using the install adapter to wedgingly fit the mounting bracket into the tapered cavity, and further manipulating the install adapter to disengage the install adapter with the mounting bracket.

In still yet another aspect of the present invention an adjustable bracket assembly for tensioning a pole mounted banner on an upright structure. The adjustable bracket assembly includes a base configured for attachment to the upright structure and a mounting bracket configured to releasably engage the base while supporting the banner. The base includes a ratcheting surface that releasably engages with a head located within the mounting bracket for enabling the mounting bracket to be vertically adjusted for providing tension on the banner.

In another aspect of the invention, a bracket assembly for use with a banner hung on an upright structure includes a base having a ratcheting surface configured for attachment to the upright structure and a mounting bracket engaging the base and supporting the banner. The mounting bracket includes a head for engaging the ratcheting surface on the base for adjusting vertical position of the banner so its hanging tension can be easily adjusted.

Yet still another aspect of the invention a banner mounting assembly comprises a first base fixedly attached to an upright structure where a first mounting bracket attaches to the first base for holding an upper end of a banner and a second base fixedly to the upright structure where a second mounting bracket attaches to the second base and is configured to releasably engage the second base while supporting a lower end of the banner. The second base includes a ratcheting surface that slideably engages with a head in the second mounting bracket for enabling the second mounting bracket to be vertically adjusted in relation to first mounting bracket for providing an adjustable tension on the banner.

In still another aspect of the invention teaches a method for forming an adjustable bracket assembly for use with a hanging banner that comprises the steps of providing a plurality of bases configured for attachment to an upright structure; providing a plurality of mounting brackets where each mounting bracket is attached to one of the plurality of bases; and forming an adjustable bracket assembly by configuring at least one of the plurality of bases such that it includes a ratcheting surface that releasably engaging with a head located within its mounting bracket for enabling the mounting bracket to be slideably adjusted on the at least one base.

Finally, another aspect of the invention includes a banner retention assembly that comprises a retention clip having a slotted gap; and where the retention clip is fastened over a banner support rod for limiting movement of a banner on the support rod. The assembly further includes use of a limited slip surface attached to a portion of the banner support rod for limiting movement of the retention clip.

These and other aspects, objects, and features of the present invention will be understood and appreciated by those skilled in the art upon studying the following specification, claims, and appended drawings.

DETAILED DESCRIPTION

Before describing in detail embodiments that are in accordance with the present invention, it should be observed that the embodiments reside primarily in combinations of method steps and apparatus components related to an apparatus and process of installing, removing and replacing banners. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
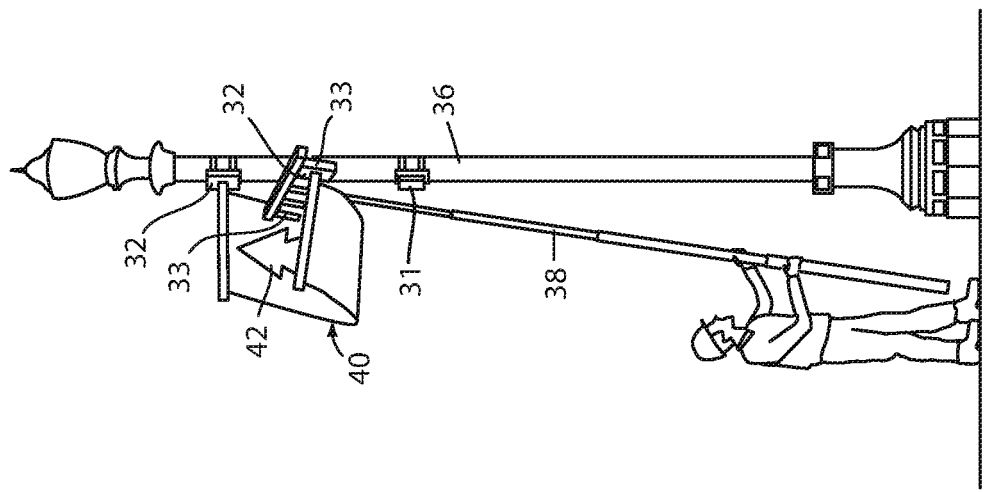
Figure 1:
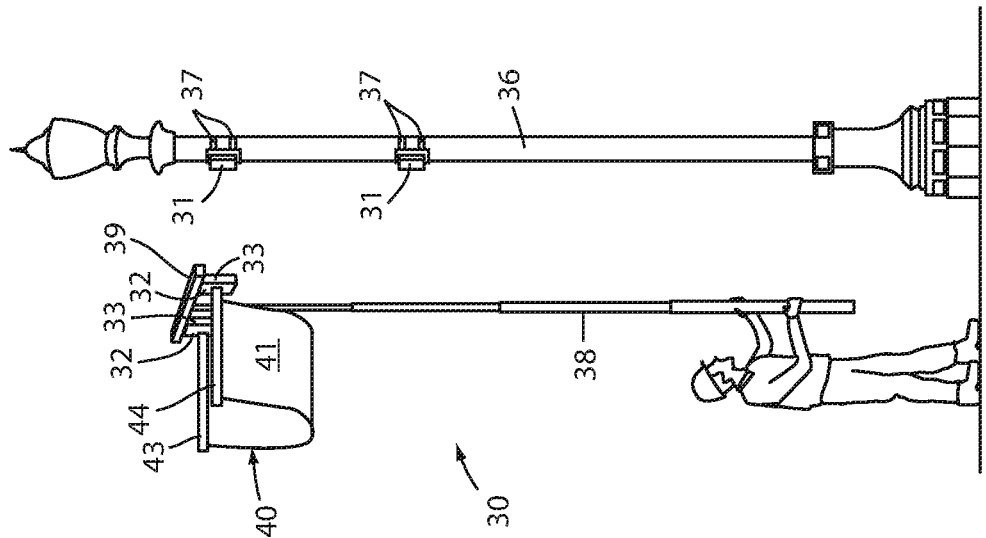
FIG. 1 is an elevational view showing an apparatus embodying the present invention including a base, a mounting bracket and an install adapter, the view showing a street light pole with two pre-attached spaced-apart bases, the worker holding a telescopingly extended pole with the install adapter at its top end, with the install adapter holding the two mounting brackets and the banner while being lifted to a position near a top of the street light pole for install onto the bases.
Figure 4:
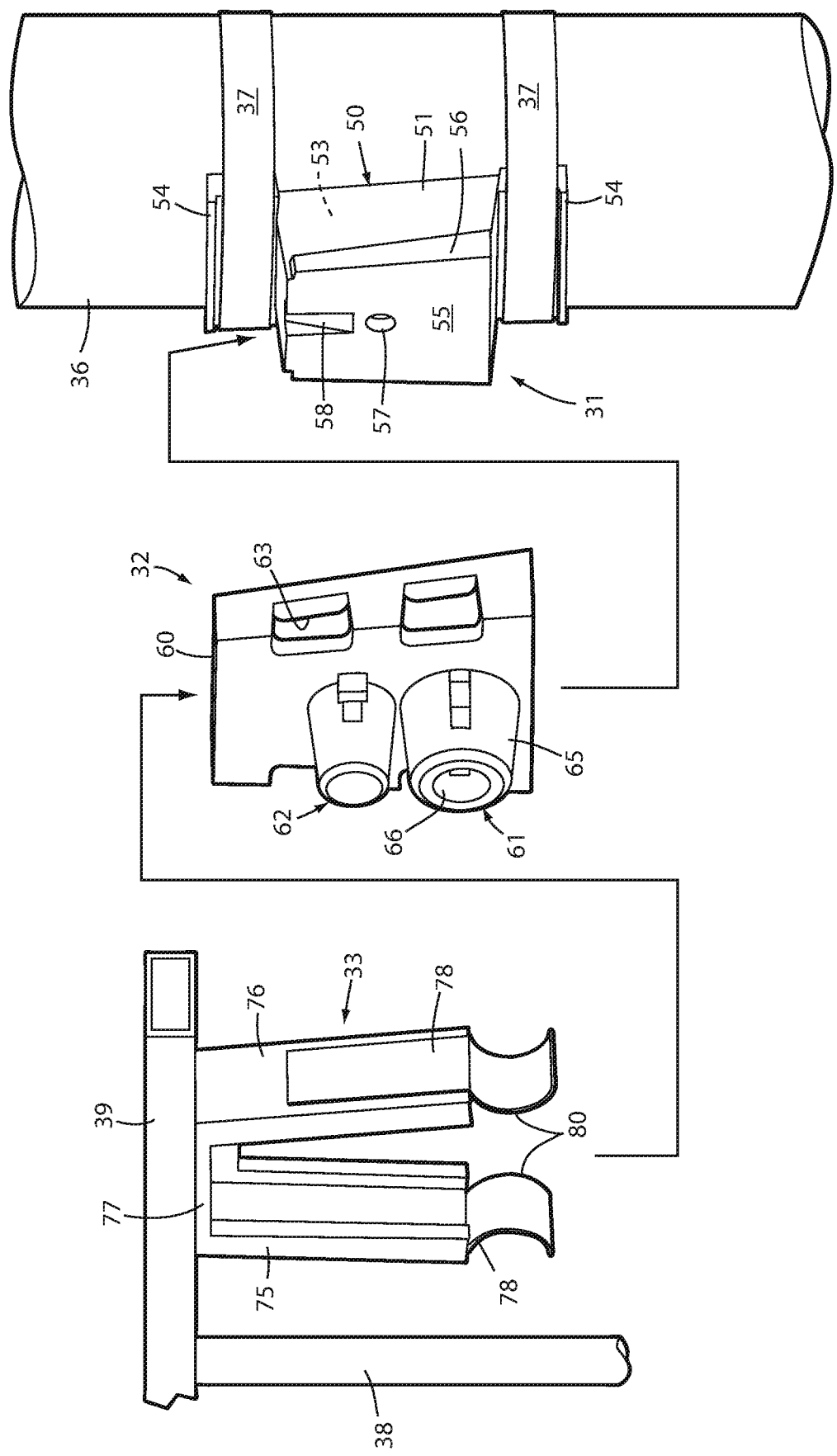
FIG. 4 is an exploded perspective view of the base, the mounting bracket, and the install adapter of FIG. 1, and including a line showing inter-engagement of components.
Figure 5:
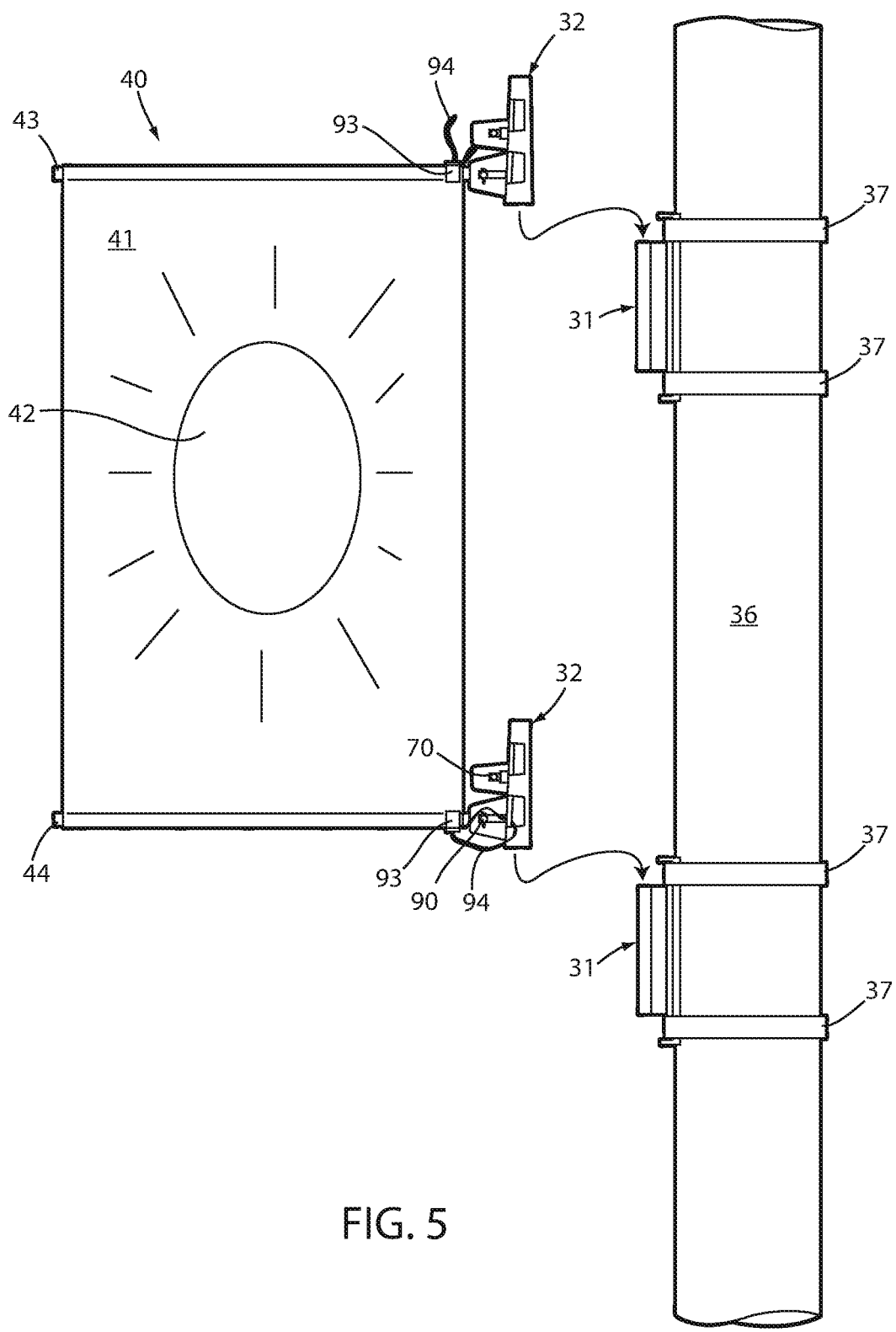
FIG. 5 is an enlarged view similar to a top of FIG. 1, but showing the banner with top/bottom rods and top/bottom mounting brackets, and showing a path of assembly of the top/bottom mounting brackets to the respective bases on the pole (the top being attached first).
Figure 12:
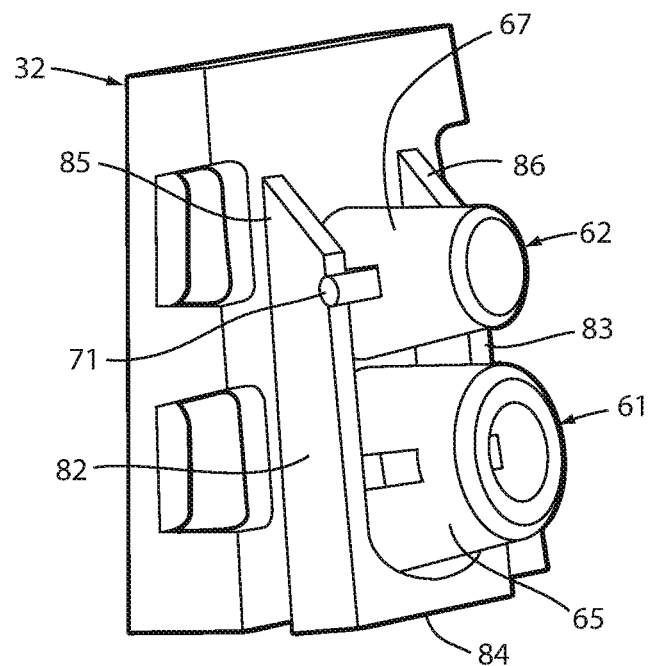
FIG. 12 is a perspective view of a removal adapter engaging the mounting bracket (see also FIG. 9B), the removal adapter engaging arms of the spring-biased retainer on the mounting bracket to release the retainer, thus facilitating removal of the mounting bracket from a given base, thus eliminating a need for separate loose fasteners and allowing the removal to be done from a remote position.
Figure 13:
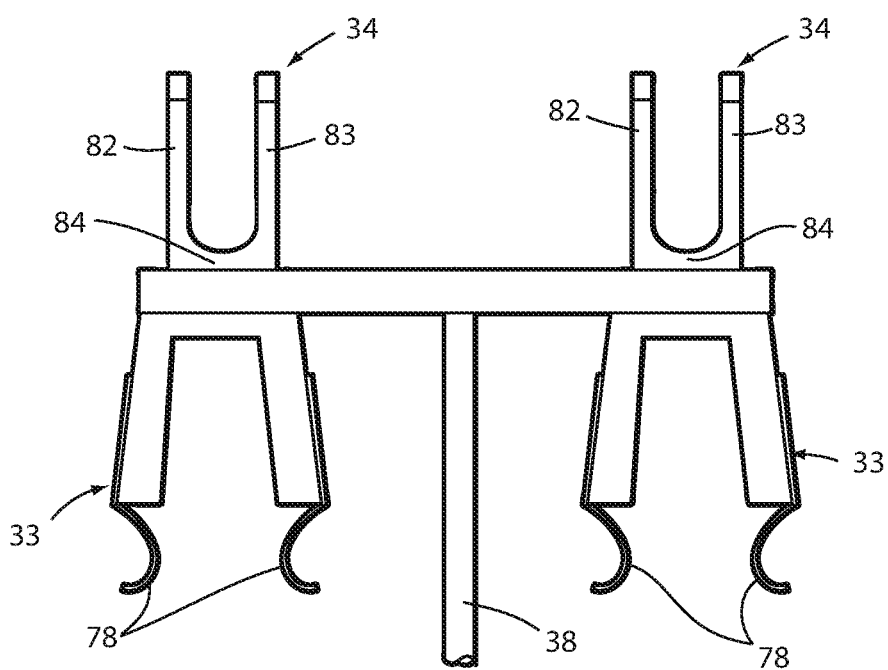
FIG. 13 is a side view of a modified apparatus that includes a pole, two down-facing spaced-apart install adapters (see FIG. 10) and two up-facing spaced-apart removal adapters (see FIG. 12).

The present apparatus 30 (also called "attachment system" herein, FIGS. 1-4) includes bases 31, mounting brackets 32, an install adapter 33 (FIGS. 4, 8), and further a removal adapter 34 (FIGS. 12-13). These components combine and cooperate to allow a worker to install a banner 40 high in the air while standing on the ground. FIGS. 1-3 illustrate a pair of based 31 on a street light pole, but it is contemplated that the base can be supported on any upright structure. Further, as used herein, the term "banner" is intended to cover flags, aesthetic decorative sheets/banners/fabrics, and/or other flexible sheets with indicia such as pictures, designs, information or writing/text/indicia thereon. More specifically, the present apparatus 30 includes a pair of spaced bases 31 attached to an upright structure 36 (such as the street light pole or building). The illustrated straps 37 attach two bases 31 to the street light pole, but it is contemplated that the base can be attached by any fastener desired, such as screws, bolts, zip ties, hooks, brackets, nails, adhesive, bonding, and the like. A manually-held telescopingly-extendable pole 38 includes a top end with transverse bar 39, with two spaced-apart install adapters 33 extending downward from the transverse bar 39. The banner 40 includes a flexible sheet 41 with indicia 42 thereon and with upper and lower horizontal rods 43, 44 supporting the banner 40 when installed. A mounting bracket 32 is attached to an inboard end of each rod 43, 44, and if desired, a clip or zip tie or other anti-slip component is used to keep the banner 40 from bunching toward one end of the rods 43, 44.

One method of installation proceeds as follows. The bases 31 are pre-installed on an upright support structure (e.g. street light pole or building) in a desired spaced-apart relationship. Two mounting brackets 32 (with rods 43, 44 fixed therein) are releasably engaged on the install adapters 33, with the banner 40 hanging between the rods. The extendable pole 38 is extended (with the worker standing on the ground), and the mounting brackets 32 are manipulated by the worker to first lower the top mounting bracket 32 into engagement with the top base 31 (see FIG. 2), and then secondly to lower the bottom mounting bracket 32 into engagement with the bottom base 31 (see FIG. 3). Once both mounting brackets 32 are attached to respective bases 31, the banner 40 (including sheet 41 and rods 43,44) are supported on the upright structure 36, with the banner 40 spread out between the rods 43,44 in a readable position. After installation, the extendable pole 38 with install adapters 33 can be pulled away. Notably, the present system does not require any separate loose fasteners, thus allowing remote manual installation without the need for separate hand tools or lift trucks or ladders. The present installation method is believed to be much safer, since the banner 40 can be hung by a worker positioned remotely from the banner 40 (i.e. on the ground and not with the worker positioned many feet above ground). Also, the banner 40 can be hung without using separate fasteners, and without all the cumbersomeness and difficulties presented when trying to manipulate fasteners while located high above the ground (and often, while experiencing difficult weather, e.g. cold, hot, windy, rainy, snowing, or other weather).

The base 31 (FIG. 6) can be made from metal or polymeric or other structural material, and can be made from different methods, such as molding or machining. The illustrated base 31 is a polymeric molded body with first section 51 shaped to stably engage the upright structure 36 (such as a curve matching a shape of a street light pole), and an oppositely-facing second section 52 shaped to stably engage the mounting bracket 32. The first section 51 also includes on its "back side" a pair of lateral flanges 54 having a width and shape to receive straps 37 (or zip ties or a steel band) for "loop" attachment to the upright structure 36. Lateral flanges 54 may also include holes or other structure for receiving attachment bolts/screws/nails/hooks/brackets to retain the base 31 to the upright structure 36, depending on a shape/configuration of the existing upright structure 36. It is contemplated that the first section 51 can be shaped and configured to provide for attachment to many different upright structures, and for attachment by many different fastening devises. For example, it is contemplated that banners 40 could be attached to building walls and countless other structures providing a high location allowing for optimal visibility of a raised banner 40. The second section 52 includes a upwardly tapered protrusion 55 with edge flanges 56, a retainer hole 57, and ramp 58 at a center of its top region.

The mounting bracket 32 (FIG. 7) is a polymeric molded body having a mounting section 60, a boss-like banner-rod-engaging section 61 and a retainer section 62. The mounting section 60 includes flanges 63 defining a mating tapered cavity 64. The flanges 63 of the mounting section 60 are shaped to slidingly engage the edge flanges 56 on the tapered protrusion 55 for mating assembly of the mounting bracket 32 downwardly onto the base 31. The banner-rod engaging section 61 includes a cylindrical protrusion 65 with center hole for receiving the end of one of the banner rods 43, 44. The cylindrical protrusion 65 may include a latching hole 66 or an aperture or other feature allowing the rod 43 (or 44) to be positively anchored to the cylindrical protrusion 65. The banner 40 can be fixed to the rods 43 and 44 by a clip or other means so that the banner doesn't bunch to one end of the rods 43, 44. For example, a U-shaped clip on the rods or a zip tie tied to a feature of the mounting bracket itself can be used.

The retainer section 62 of the mounting bracket 32 (FIG. 9A) includes a hollow boss 67 with side slots 68 and standoffs 69. A T-shaped spring-biased retainer 70 (also called a "latch member" herein) includes opposing arms 71 that extend through slots 68, and includes a latch tip 72 shaped to engage the latching hole 66 in the base 31. A bias spring 73 biases the retainer 70 toward the base 31 to a locking position when the mounting bracket 32 is attached to the base 31. The ramp 58 is shaped so that when the mounting bracket 32 is lowered onto a given base 31, the ramp 58 slidingly engages the retainer to overcome the bias of the spring 73, causing the latch tip 72 to retract far enough to slip up and into the latching hole 66. The resulting retaining force and "action" is positive and robust, such that a worker can feel the positive engagement when it occurs. The bias spring 73 causes the opposing arms 71 to move into abutment with the standoffs 69, with the abutment providing sufficient space under the arms 71 for the wedge-tips of the removal adapter 34 to get under the arms 71 to release the latch member 70 from the latching hole 66 for removal, as discussed below (see FIG. 12).

Figure 9A:
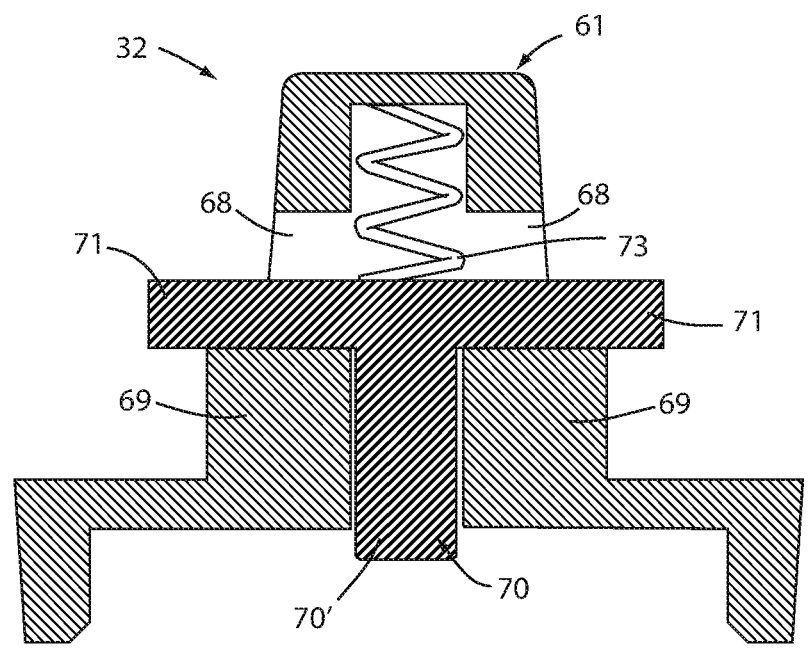
FIG. 9A is a cross sectional view of the mounting bracket taken along lines IX-IX in FIG. 7, the spring-biased retainer being shown in a locking position.
Figure 9B:
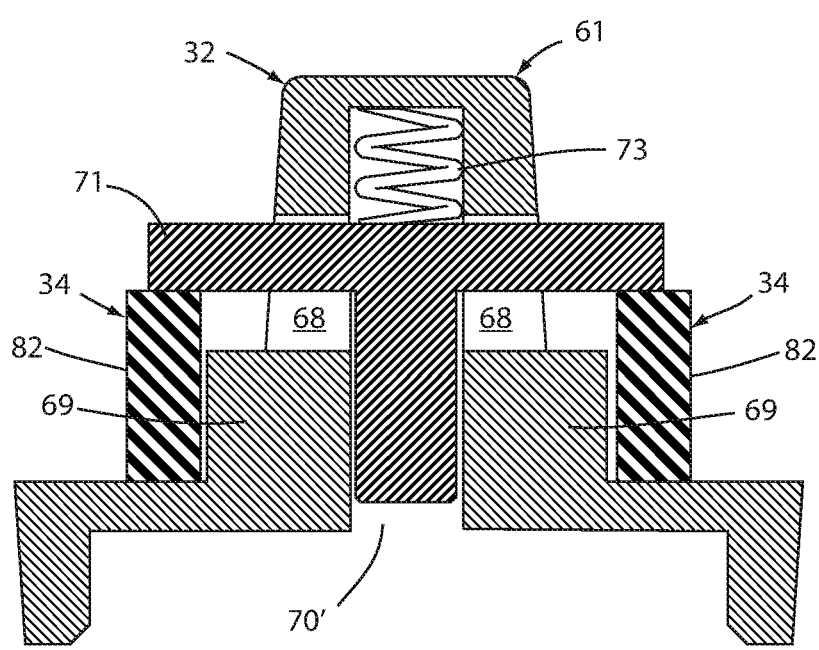
FIG. 9B is a cross sectional view similar to FIG. 9A, but showing the removal adapter with fingers holding the spring-biased retainer on the mounting bracket in a released position.
Figure 9C:
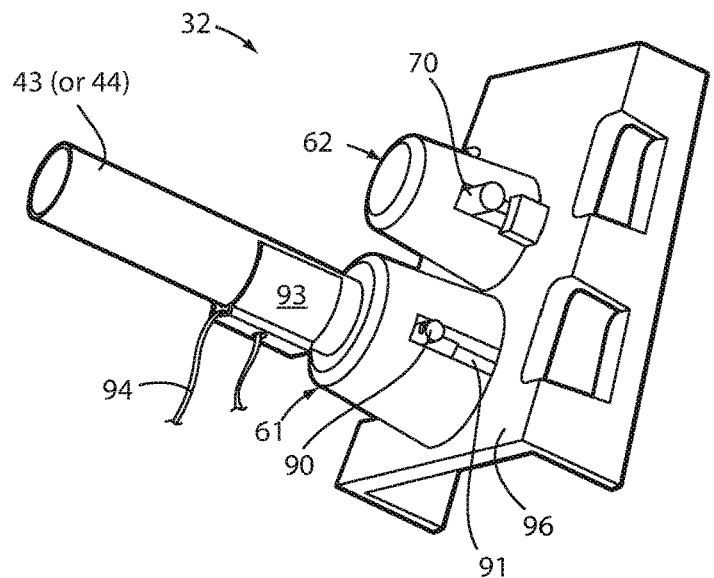
FIG. 9C, FIG. 9D and FIG. 9E are additional perspective views of the mounting bracket from FIG. 7, showing a relationship of the mounting bracket, the retainer, the retainer's biasing spring, one of the banner-carrying rods (see FIG. 5), a banner sheet-holding clip, and miscellaneous other components.
Figure 9D:
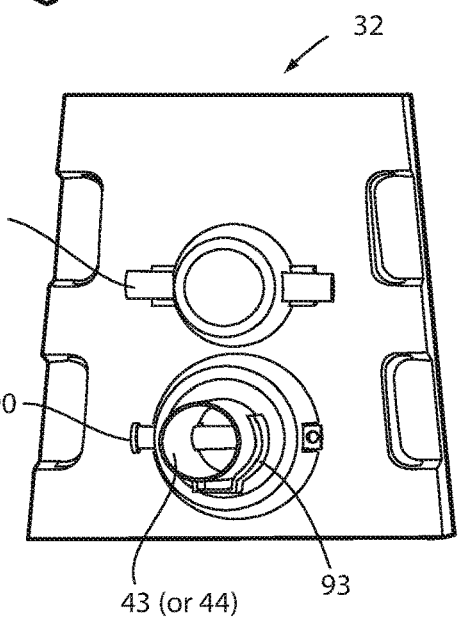
Figure 9E:
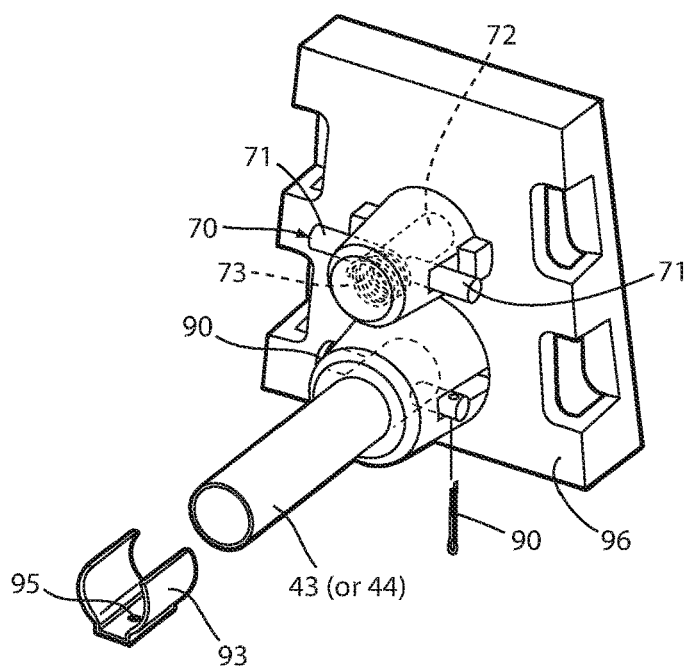

FIG. 9B is a cross sectional view similar to FIG. 9A, but showing the removal adapter 34 with fingers 82 engaging and holding the retainer 70 in its disengaged/release position. FIG. 9C, FIG. 9D and FIG. 9E are additional perspective views of the mounting bracket 32 from FIG. 7, showing a relationship of the mounting bracket 32, the retainer 70, and the retainer-biasing spring 73. FIG. 9C, FIG. 9D and FIG. 9E also show a relationship of the rod 44 (or 45), rod-anchoring components securing rods to the mounting bracket 32, and a banner clip holding the banner 40 to the rod 44 (or 45). The banner rods 43 and 44 are shown as hollow metal tubes, but it is contemplated that they may also be a solid or filled, and can be plastic or another material. The rod 43 (and rod 44) includes a hole, and an anchoring pin 90 that extends through a hole in the rod 43 (and 44), with the anchoring pin 90 also extending through holes/slots 91 in the boss 61 of the mounting bracket 32 to retain the rod securely to the mounting bracket 32. It is contemplated that the anchoring pin 90 can be a bolt or spring clip or other attachment member that self-secures (or that frictionally engages) into the mounting bracket 32 so that the anchoring pin 90 does not inadvertently come loose. It is contemplated that the rods 44/45 can be friction-fit or adhered or bonded inside the mounting bracket 32. A U-shaped resilient banner-securing clip 93 snaps over the banner sheet 41 onto the rod 43 (or 44), thus securing the banner sheet 41 to the rod 43 (or 44). A zip tie 94 (or other anchoring strap) is extended through a hole 95 in the clip 93 and through a hole or apertured flange or other feature (such as at location 96) on the mounting bracket 32 or on the base 31. Thus, the clip 93 remains secured to the mounting bracket 32 (i.e. thus preventing the clip 93 from "walking" toward an outer end of the rod 43 (or rod 44) where it would fall off the rod 43 (or rod 44). The banner 40 includes a lower chamber sewn into the banner to receive the rod(s). The outer end of the illustrated banner 40 is fixed to the outer end of the rod by sewing a closed end on the banner . . . and/or by a cap or cup-shaped member that keeps the banner on the outer end of the rod.

The install adapter 33 (FIG. 8, and see FIG. 10) is a metal or polymeric molded U-shaped body with downwardly-extending channels 75, 76 connected by cross member 77. The channels 75, 76 are shaped to mateably engage the outer sides of the mounting bracket 32. Leaf springs 78 extend downward from the ends of the channels 75, 76 (or can be positioned inside of the channels) and include an inwardly radiused portion 80 that extends slightly inboard of the cavity defined between the channels 75, 76. When the mounting bracket 32 is positioned in the install adapter 33, the radiused ends 80 of the leaf springs 78 resiliently flex to allow the mounting bracket 32 to be positioned in the install adapter 33, and then flex to engage a bottom of the mounting bracket 32 to retain the mounting bracket 32 to the install adapter 33 as a unit. This allows a person holding the extendable pole 38 (FIGS. 10, 1-3) to manipulate the pole to position the mounting bracket 32 over a mating base 31. With a downward movement of the extendable pole 38, the mounting bracket 32 is pulled into mating engagement with the base 31. With a subsequent upward movement, the install adapter 33 is pulled out of the mounting bracket 32, with the leaf springs 78 flexing to release the mounting bracket 32. It is easiest to attach the top mounting bracket first, and then the bottom mounting bracket, but alternative methods can be used if desired.

Figure 10:
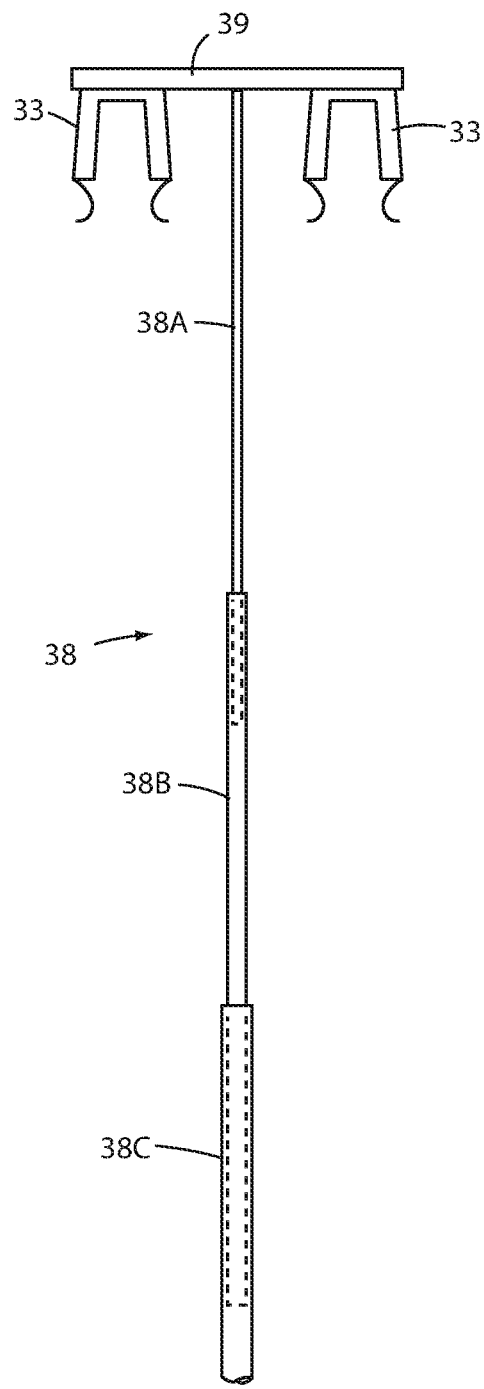
FIGS. 10-11 are side and front views of the telescopingly extendable pole with install adapter at its top end, similar to that shown in FIG. 1.
Figure 11:
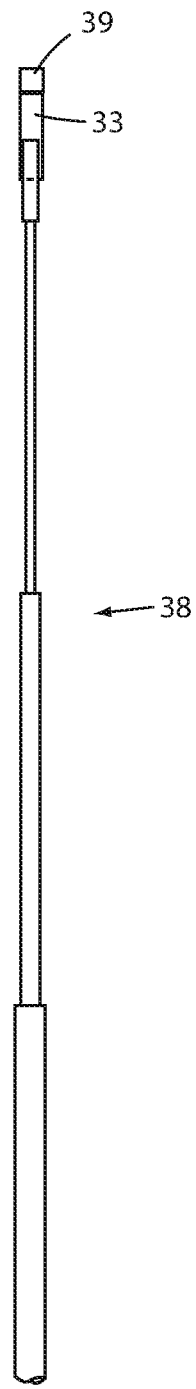

FIGS. 10-11 show the extendable pole 38 with transverse bar 39 supporting two down-facing install adapters 33. The extendable pole 38 includes multiple tubular sections 38A, 38B, 38C (or more) that can be telescopingly extended or retracted as needed by the worker to accomplish the present task. The illustrated pole 38 has multiple sections that do not spin relative to each other, such as a non-circular cross section, thus giving the installing person more control during an installation sequence. Extendable poles 38 are well known and commercially available, such that a more detailed description is not required herein for an understanding by persons skilled in this art.

The present apparatus 30 also includes a removal adapter 34 (FIGS. 12-13) for removing a mounting bracket 32 from a base 31 from a remote position on the ground. The illustrated removal adapter 34 includes an up-facing U-shaped body with fingers 82, 83 connected by a cross member 84. The fingers 82, 83 are spaced apart sufficiently to fit on opposite sides of the protrusions 65, 67 of the mounting bracket 32. Further, the tips 85, 86 of fingers 82, 83 are tapered or wedge-shaped and angled so that the tips 85, 86 will slip under the arms 71, causing release of the retainer 70 from the latching hole 66 for removal. (See FIGS. 9B and 12.)

Figure 16:
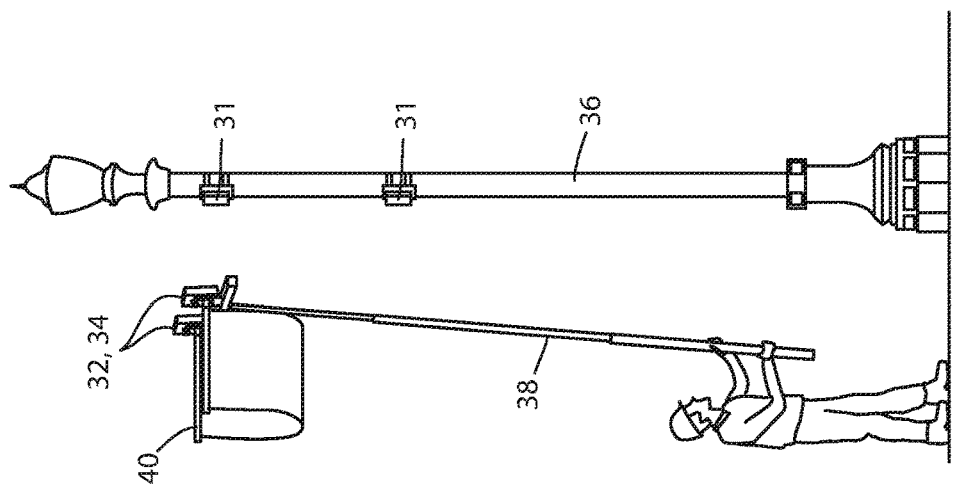
FIGS. 14-16 are elevational views using the pole tool with install adapters of FIG. 13, showing sequentially removing the banner/mounting brackets from the bases on the light pole.
Figure 15:
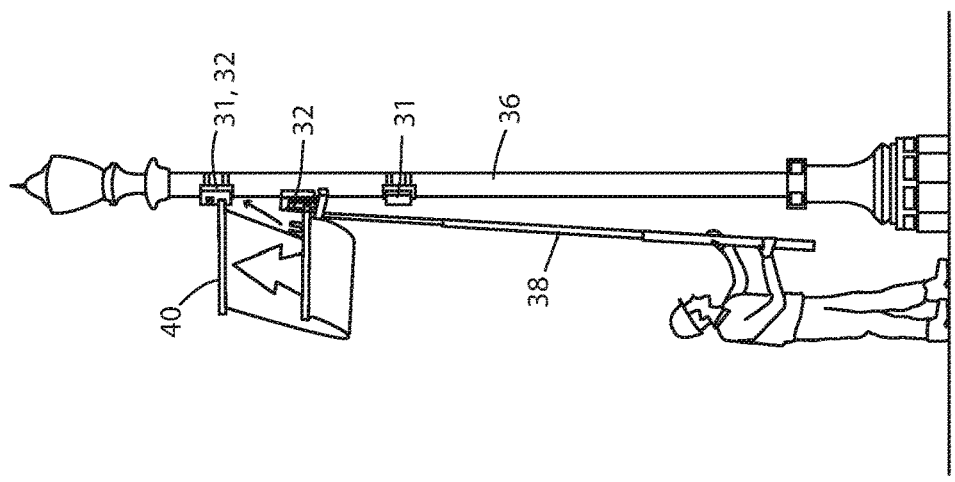
Figure 14:
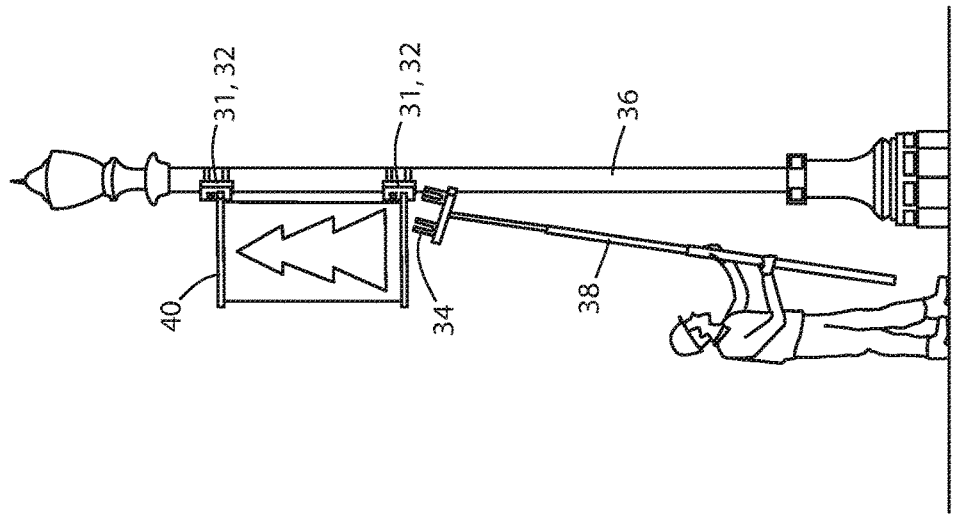

FIG. 13 illustrates a pole-mounted tool with two down-facing install adapters 33 and two up-facing removal adapters 34 installed on a single transverse bar 39 on the upper end of the extendable pole 38. FIGS. 14-16 illustrate a method of removing a banner 40 from an upright structure 36, including positioning the pole 38 (FIG. 14) so that the removal adapter 34 is under the lower mounting bracket 32 and pressing upward to release the retainer 70 and remove the lower mounting bracket 32 (see FIG. 15), and then repeating the process on the upper mounting bracket 32 (FIG. 16).

The present apparatus 30 allows installation of a banner 40 while standing on the ground, and also allows later removal of the banner 40 while standing on the ground. No separate loose fasteners are required. Notably, where the pole tool has both installer adapters and removal adapters, the present apparatus allows a worker to remove an existing hanging banner 40 and then immediately install a new replacement banner 40 without lowering his extendable pole 38, thus saving considerable time in the process. For example, the pole tool 38 illustrated in FIG. 13 allows this.

While the present drawings and illustrations show the banner 40 mounted to a street light pole 36, it is specifically contemplated that the present apparatus and innovative features can be used to mount banners on telephone poles, building walls, billboards, bleachers, roofs, and virtually any upright structure that will support a banner and give good visibility. The present apparatus and innovative features can be used by city, state, and federal governments, as well as by teams, businesses, and any other entity wanting to hang a banner for advertising or other purposes.

Modification

Figure 17:
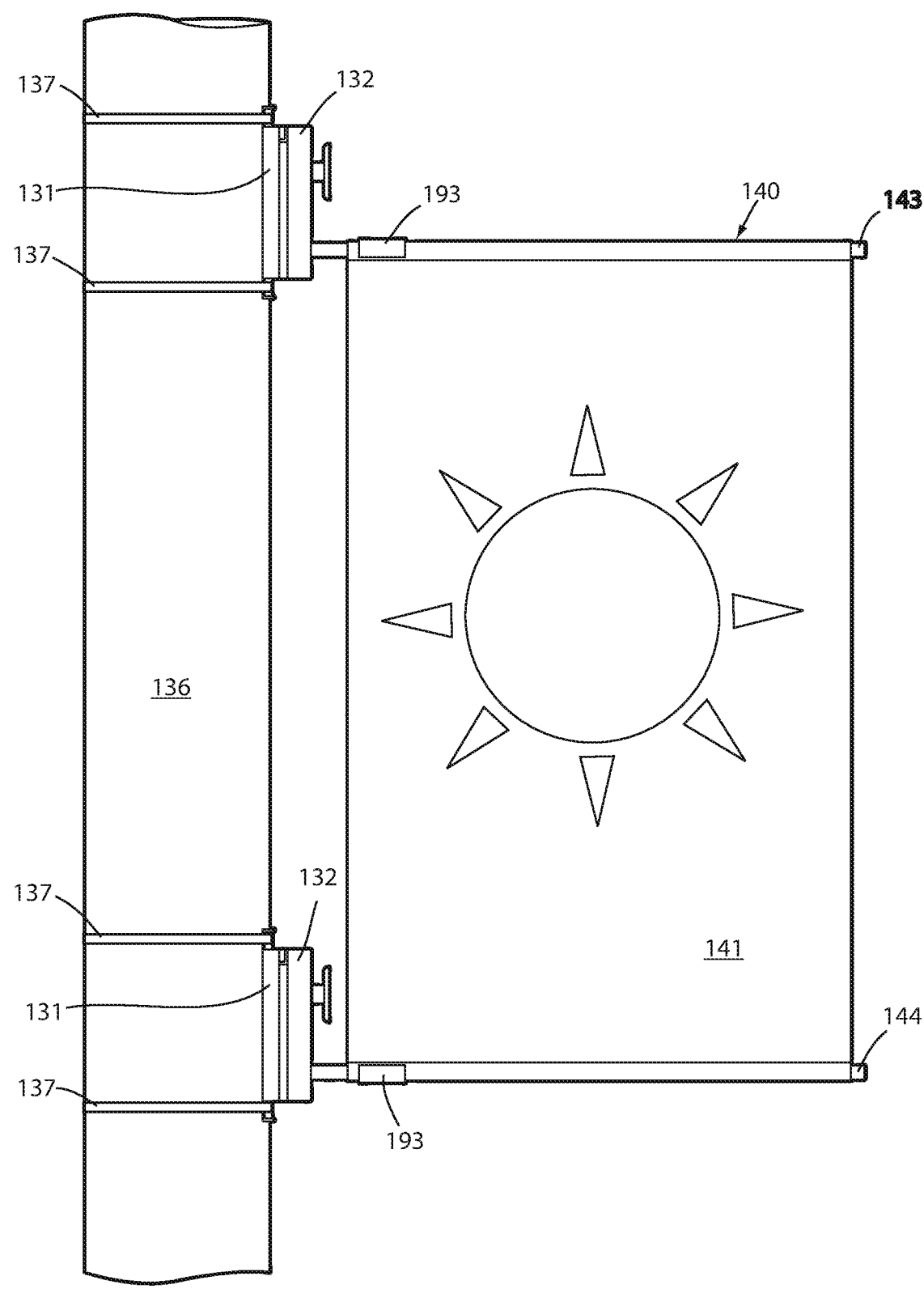
FIG. 17 is a fragmentary elevational view similar to FIG. 3, but showing a banner held by a modified attachment system including two modified bases and two modified mounting brackets.
Figure 18:
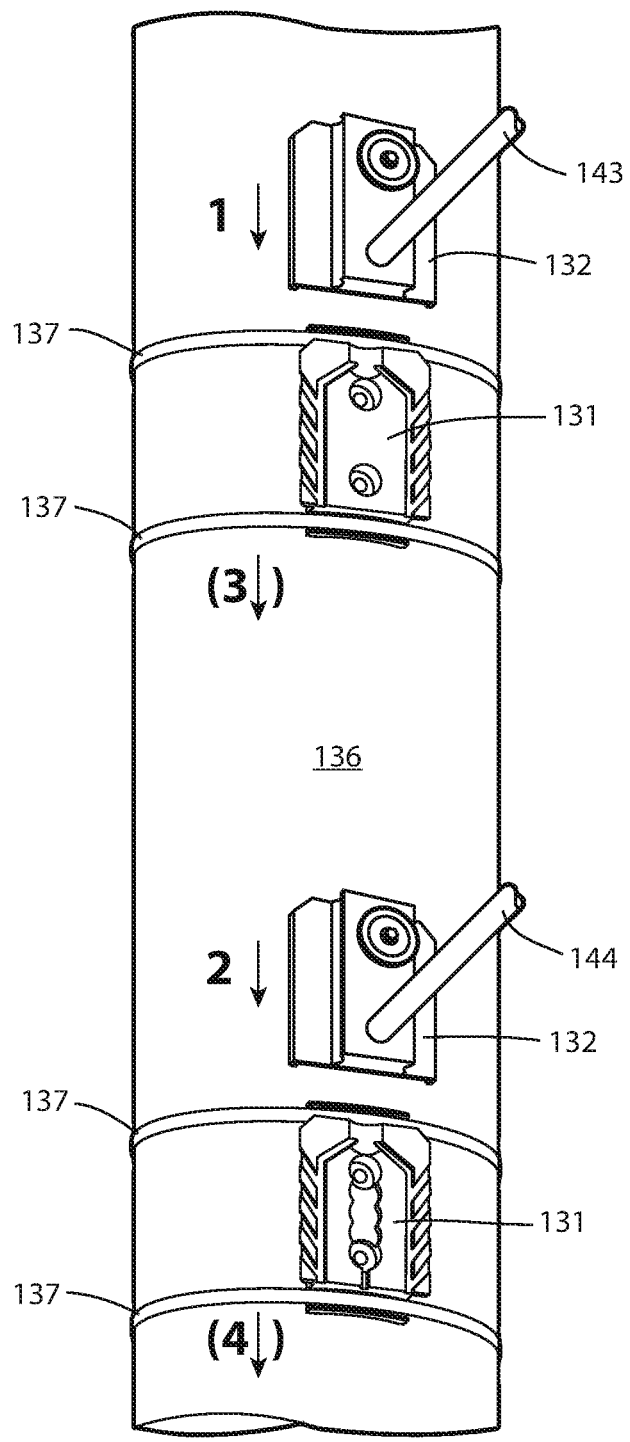
FIG. 18 is an exploded perspective view of FIG. 17, showing the banner-carrying mounting brackets exploded from a pair of the street-light-pole-mounted bases.
Figure 20:
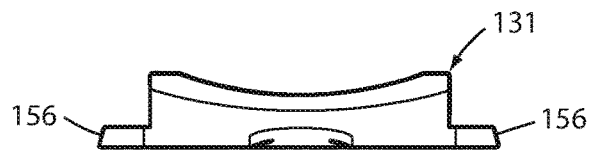
FIGS. 19-23 are front, top, side, bottom and back views of the base of FIG. 18.
Figure 19:
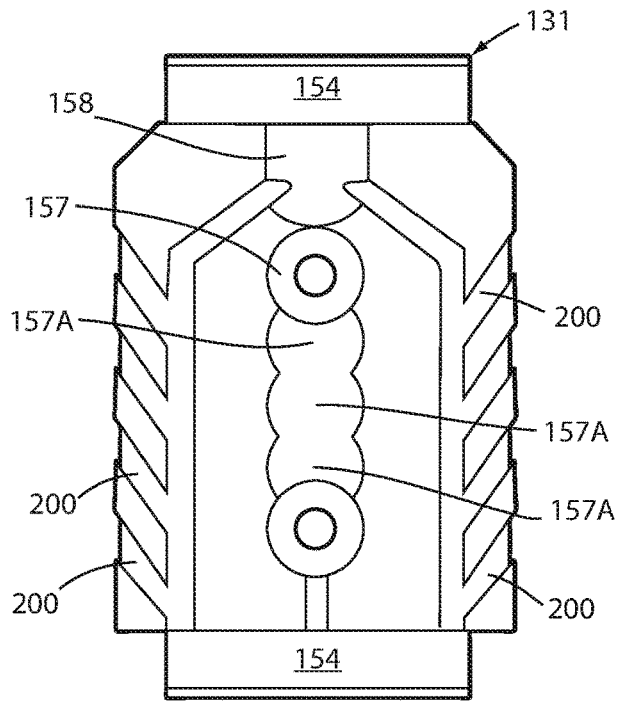
Figure 21:
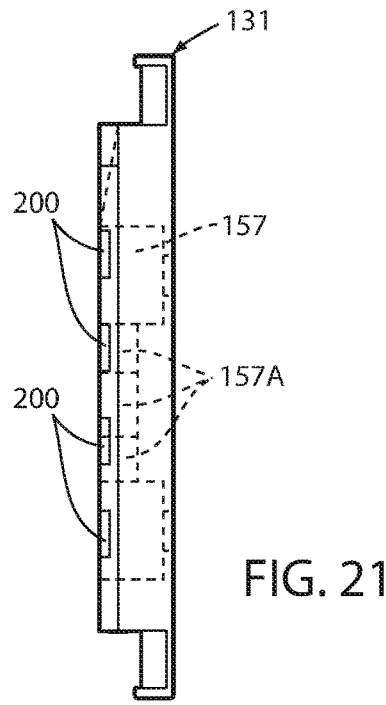
Figure 35:
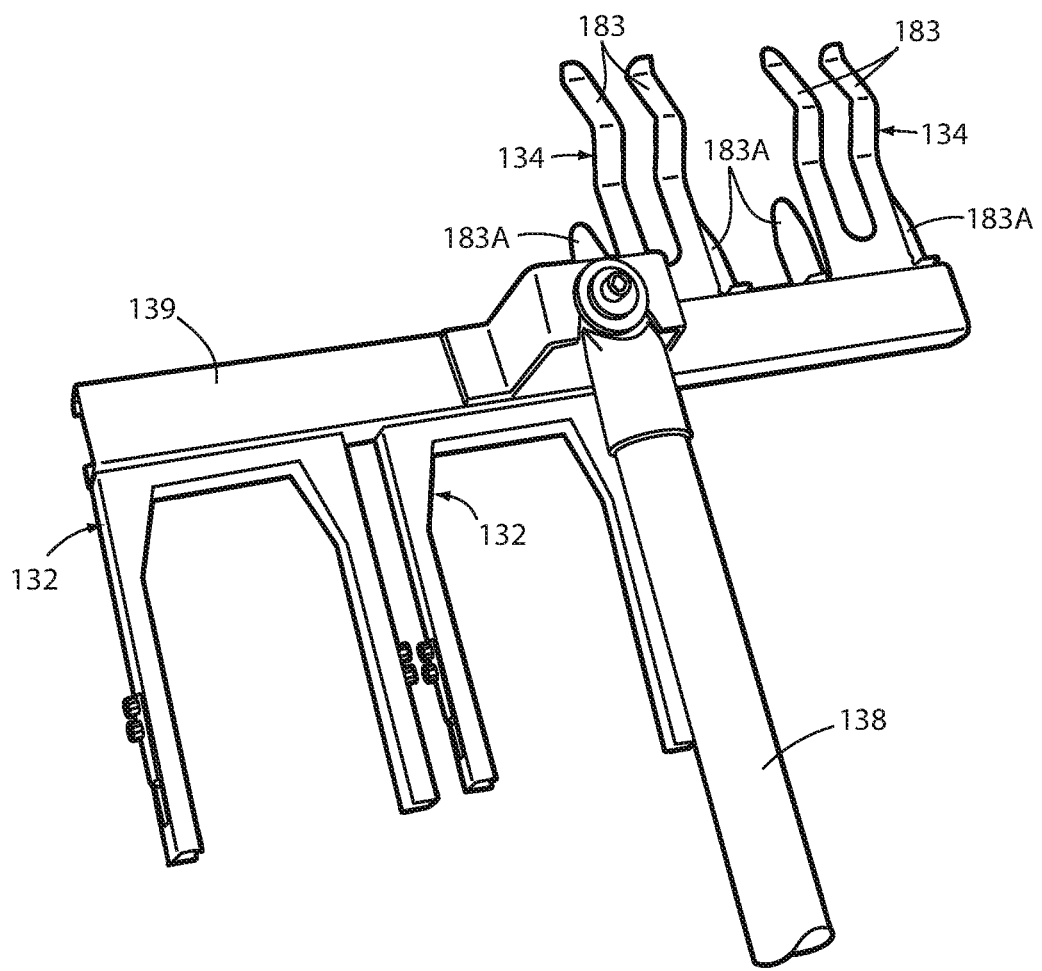
FIG. 35 is a perspective view of a pole-attached tool including two down-facing installer adapters on a left side and two up-facing removal adapters on a right side.
Figure 36:
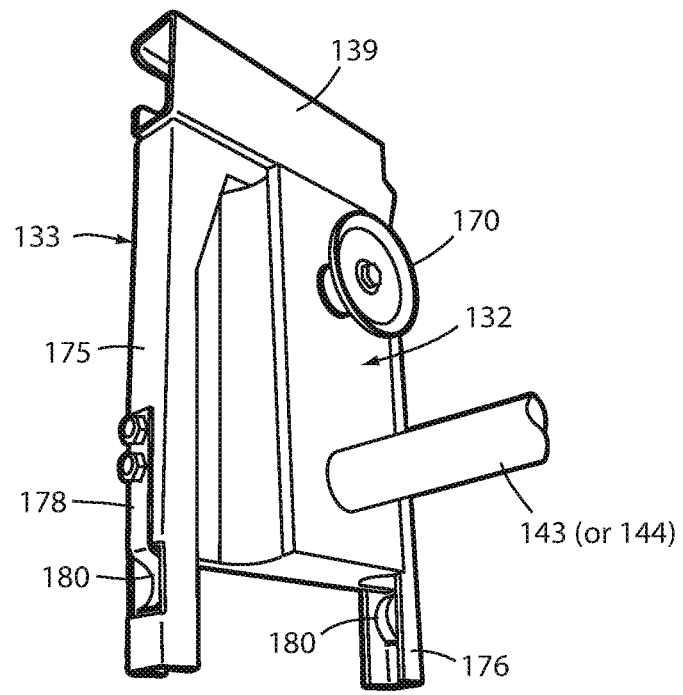
FIG. 36 is a perspective view showing a mounting bracket releasably held in the installer adapter of FIG. 35.
Figure 37:
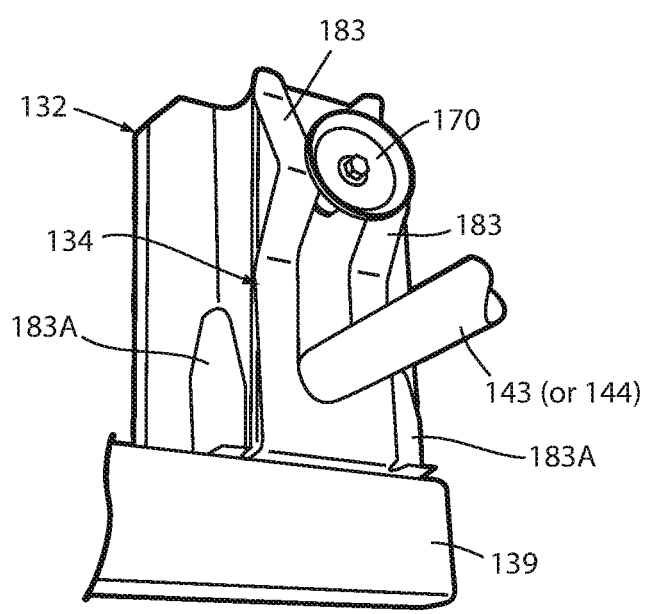
FIG. 37 is a perspective view showing a mounting bracket held in the remover adapter, with leaf-spring prongs on the remover adapter engaging the spring-biased retainer on the mounting bracket to hold the retainer in its release position, and bullet-nose alignment prongs centering the removal adapter on the mounting bracket.

A modified attachment system/apparatus (also called a "system") (FIGS. 17-18) includes bases 131, mounting brackets 132, and a pole-mounted tool 138 having install adapters 133 (FIGS. 35, 36), and removal adapters 134 (FIGS. 35, 37). These components combine and cooperate to allow a worker to install a banner 140 high in the air (such as 15-18 feet in the air) while standing on the ground. These components function and interrelate similarly to the components of apparatus 30, and are identified by using the same numbers but with the number 100 added to the identifying number. This is done to reduce redundant discussion. As will be understood by persons skilled in this art, it is intended that the functional discussion above also applies to the modified components described below.

Figure 22:
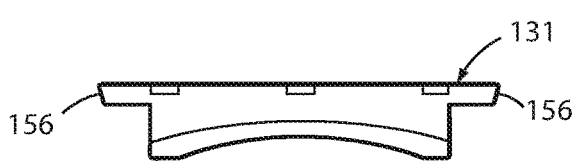
Figure 23:
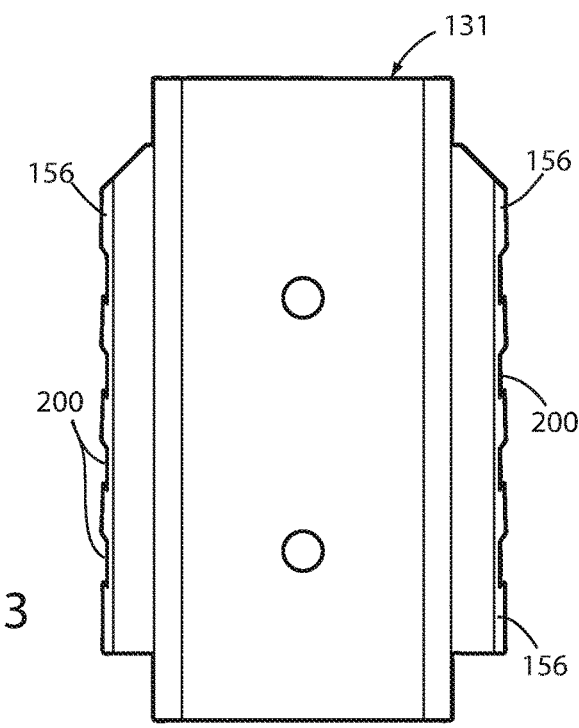
Figure 25:
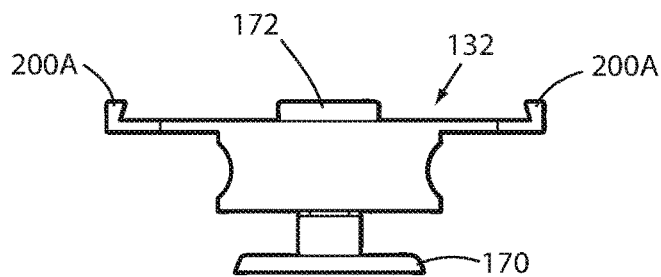
FIGS. 24-28 are front, top, side, bottom and back views of the mounting bracket of FIG. 18.
Figure 24:
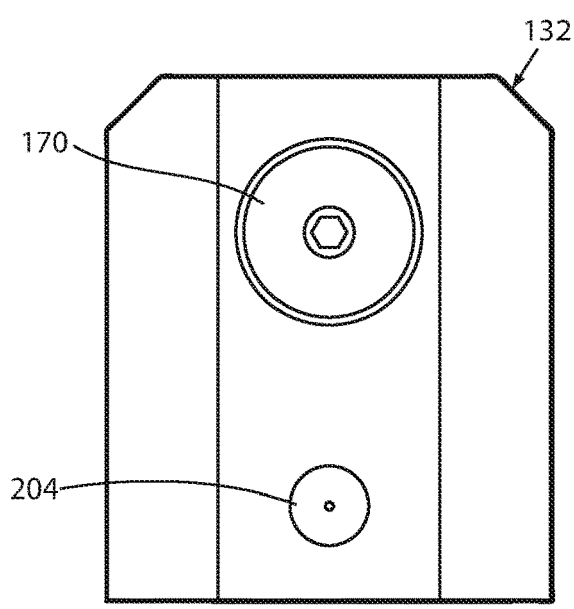
Figure 26:
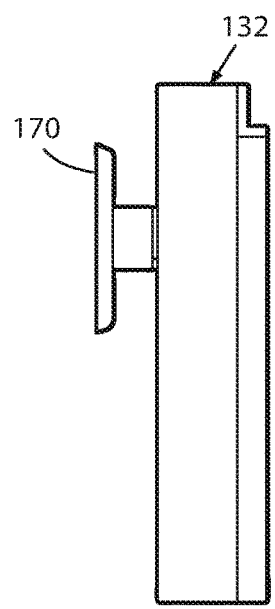
Figure 27:
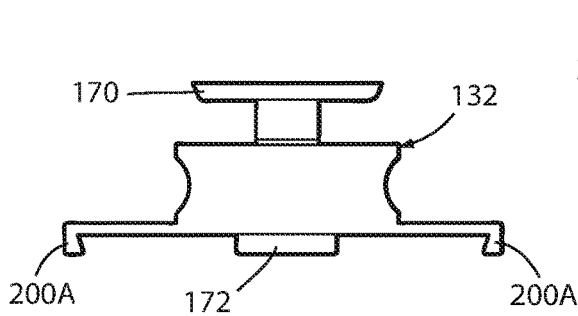
Figure 28:
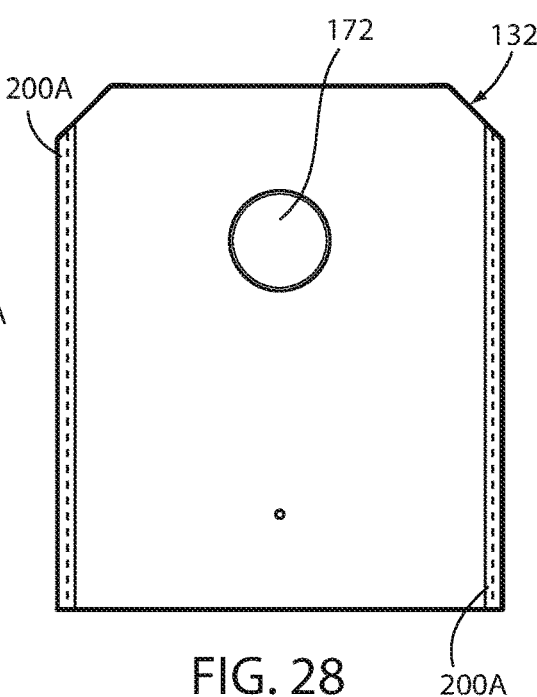

The base 131 (FIGS. 19-23) is modified from the base 31 described above to be thinner, lighter weight, lower cost, more robust and durable, easier to manufacture, and generally structurally better for being made from a polymeric or composite material (reinforced or not reinforced) intended for outdoor use. The base 131 includes a curved back side (FIG. 22, 23) shaped to engage a pole support (such as a street light post), and a front side with bracket-engaging edge flanges 156, retainer-tip-receiving hole 157, and ramp 158. Top and bottom lateral flanges 154 are shaped to receive a band extended around the street light post for clampingly securing the base 131 to a pole, such as the illustrated street light post. Angled channels 200 form a feather pattern for channeling moisture out a bottom of the base 131. This can be important when the base 131 is in an outdoor environment, since rain, ice, and other debris can penetrate and/or freeze between the base 131 and an installed mounting bracket 132 causing problems.

The illustrated base 131 has a second retainer-tip-receiving hole 157A (or several such additional holes) and a channel leading from hole 157 to hole 157A. If top and bottom bases 131 are spaced apart a correct distance, the banner 140 will have a desired tension between the top and bottom banner-carrying rods 143 and 144. However, my testing suggests that an adjustment is desired because banners are inconsistent in length and/or may "grow" or stretch in a vertical direction during use (such as the banner stretching due to wind, rain, and outdoor elements). The illustrated base 131 includes a first hole 157 and second hole 157A that can be selectively engaged by the retainer 170 to support the banner 140 in a "best tensioned" condition. It is contemplated that a top base 131 may have a single hole 157 and the bottom base 131 may have two holes 157 and 157A, or that both can have two (or more) holes 157. The second hole 157A can engaged by the retainer 170 in different ways. For example, the retainer 170 can be engaged with the first hole 157 during initial installation. Then, the removal adapter 134 can be used to disengage the retainer 170 of the bottom mounting bracket 132 and move the mounting bracket 132 down to the second hole 157A, which applies greater spacing to the rods 144, 145 and thus more tension to the banner 140.

The mounting bracket 132 (FIGS. 24-28) includes a body with vertical edge flanges 200A that slidably engage the bracket-engaging edge flanges 156. The illustrated mating surfaces of the flanges 156 and 200A are angled inwardly on opposite sides to create a dove-tail like connection, but it is contemplated that the flanges could be squared-off edges of a plate shaped to engage a "square" channel, or could be another similarly-functional configuration. The retainer 170 is mounted in a center area and spring biased by spring 173 to a locked position. The retainer 170 includes a shaft with tip 172 shaped to engage the hole 157 (or 157A) in the base 131. The retainer 170 includes a large washer-like head that can be engaged by the arms 183 of the removal adapter 134 (FIG. 35, 37). A second hole 204 on the mounting bracket 132 is located below the retainer 170 and provides a fastener-access point where a screw or zip tie other fastener can be placed.

Installation proceeds as follows (FIGS. 38-40). The bases 131 are pre-installed on a support structure in a desired spaced-apart relationship (FIG. 38). Two mounting brackets 132 (with rods 143,144 fixed therein) are releasably engaged on the install adapters 133 on the pole tool 138, with the banner 140 hanging between the rods (FIG. 38). The extendable pole 138 is used to manipulate the top mounting bracket 132 into engagement with the top base 131 (see FIGS. 29-31 and 39), and then secondly to engage the bottom mounting bracket 132 into the bottom base 131 (see FIG. 40). Once both mounting brackets 132 are attached to respective bases 131, the banner 140 (including sheet 141 and rods 143,144) are supported on the upright structure 136, with the banner 140 spread out between the rods 143,144 in a readable position (FIG. 40). If desired, the removal adapter 134 can be used to move the retainer 170 to a lower hole 157A (FIGS. 32-33). After installation, the extendable pole 138 with install adapters 133 can be pulled away. Notably, the present system does not require any separate loose fasteners, thus allowing remote manual installation without the need for separate hand tools or lift trucks or ladders, and hence is much safer, faster to install, and less frustrating than previous methods.

Figure 42:
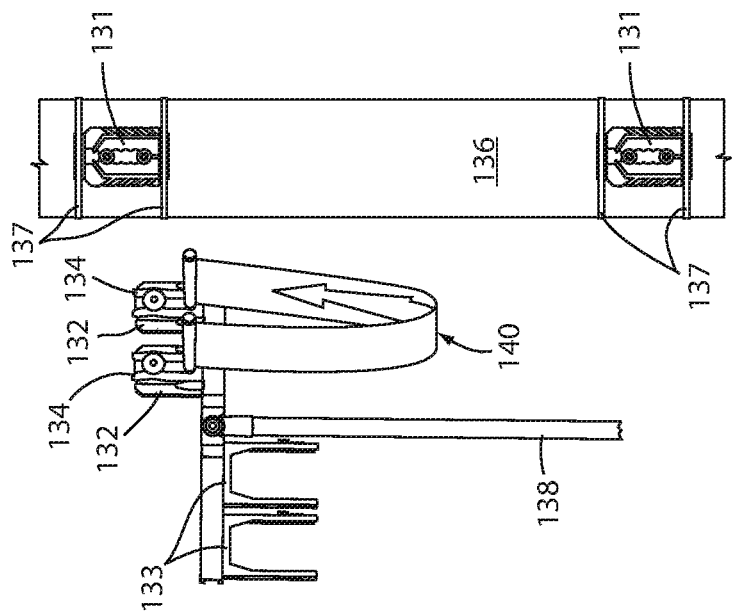
FIGS. 41-42 are views similar to FIGS. 15-16, but showing the modified system of FIGS. 17-18, 35, FIG. 41 showing the bottom mounting bracket released and on the pole tool but the top mounting bracket still attached to the top base on the street light pole, and FIG. 42 showing a completely unattached banner with top and bottom mounting brackets carried by spaced-apart remover adapters on the poll tool.
Figure 41:
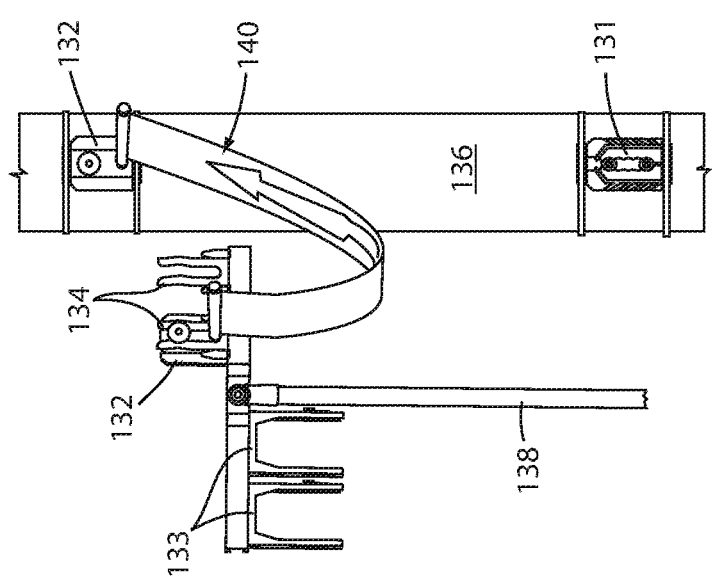
Figure 43:
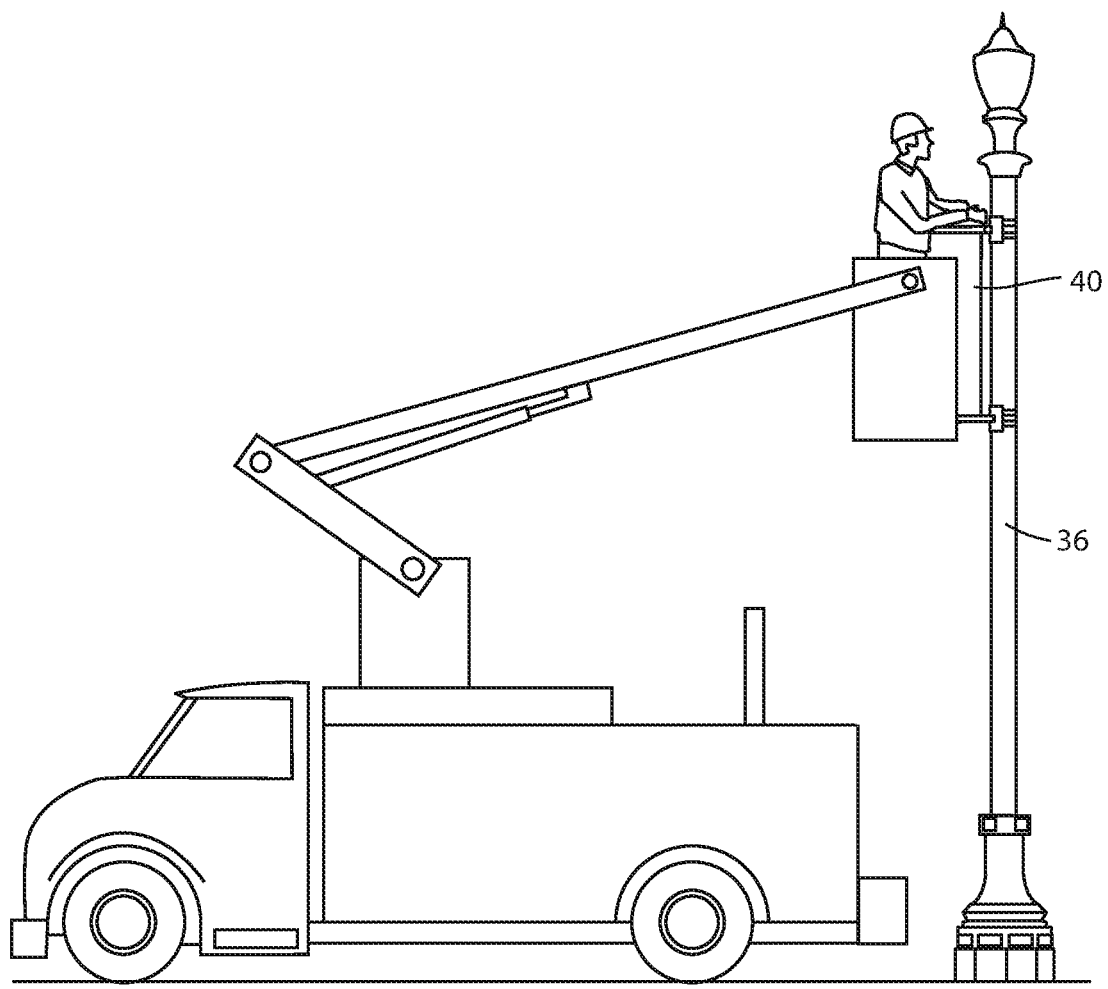
FIG. 43 is an elevational view showing a prior art method of installation.

To remove the banner 140 (FIGS. 41-42), the pole tool with removal adapters 134 is used to first engage the lower mounting bracket 132 (FIG. 41), so that with an upward movement the arms 183 engage the head of the retainer 170 to disengage it (i.e. "unlock it"), causing the mounting bracket 132 to release and slide upwardly off the base 131. The removal adapters 134 include bent-leaf-spring members 183, and also include bullet-shaped projections 183A that engage a center of the mounting bracket to align the adapter 134 on a selected mounting bracket 132 during removal. A similar procedure is used to remove the top mounting bracket 132 (FIG. 42). If desired, both the removal of a first banner 140 and installation of a second banner 140 can be done in a single sequence without lowering the pole tool 138.

Figure 45:
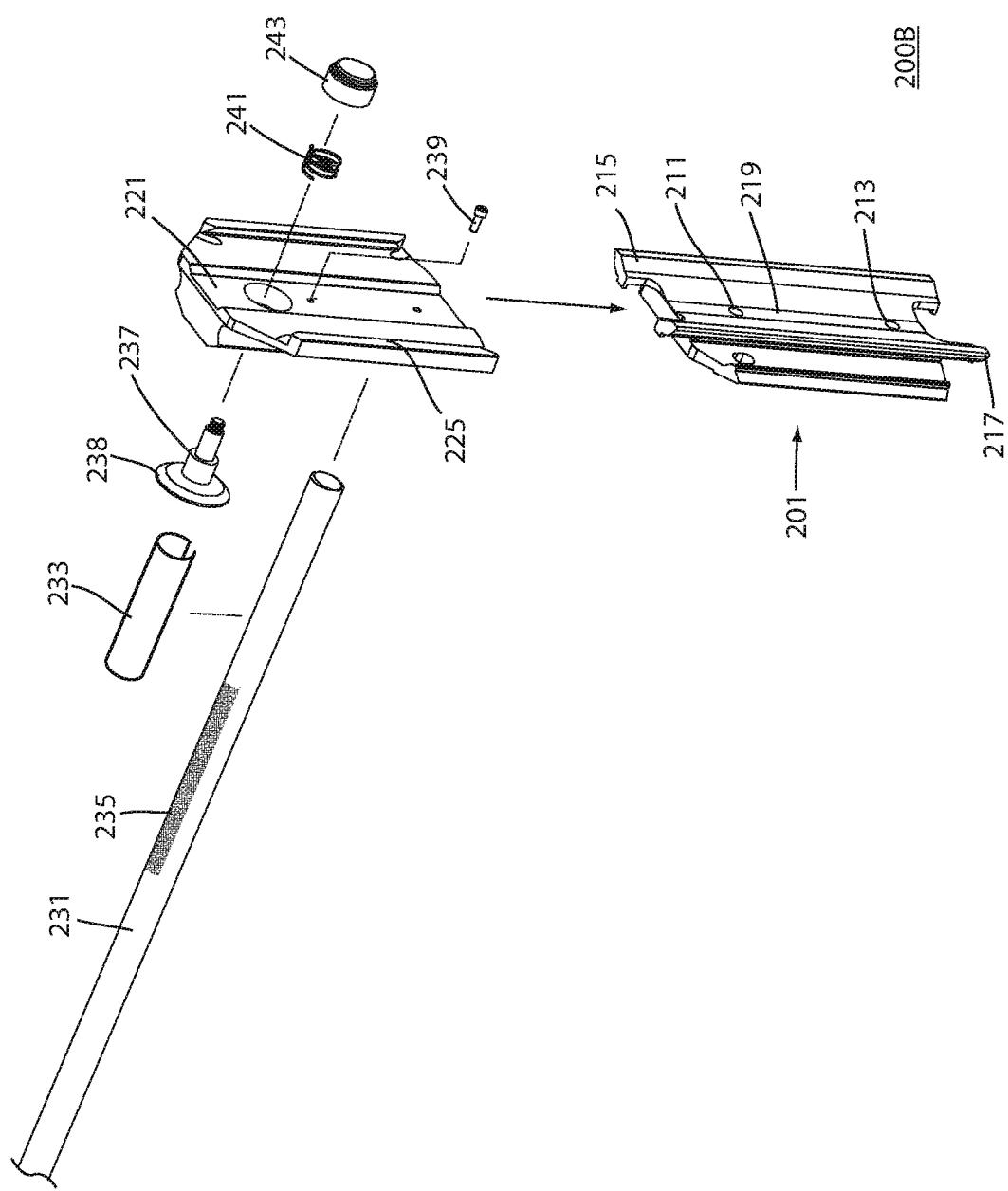
FIG. 45 is a rear exploded view of the upper adjustable bracket assembly shown in FIG. 44.
Figure 46:
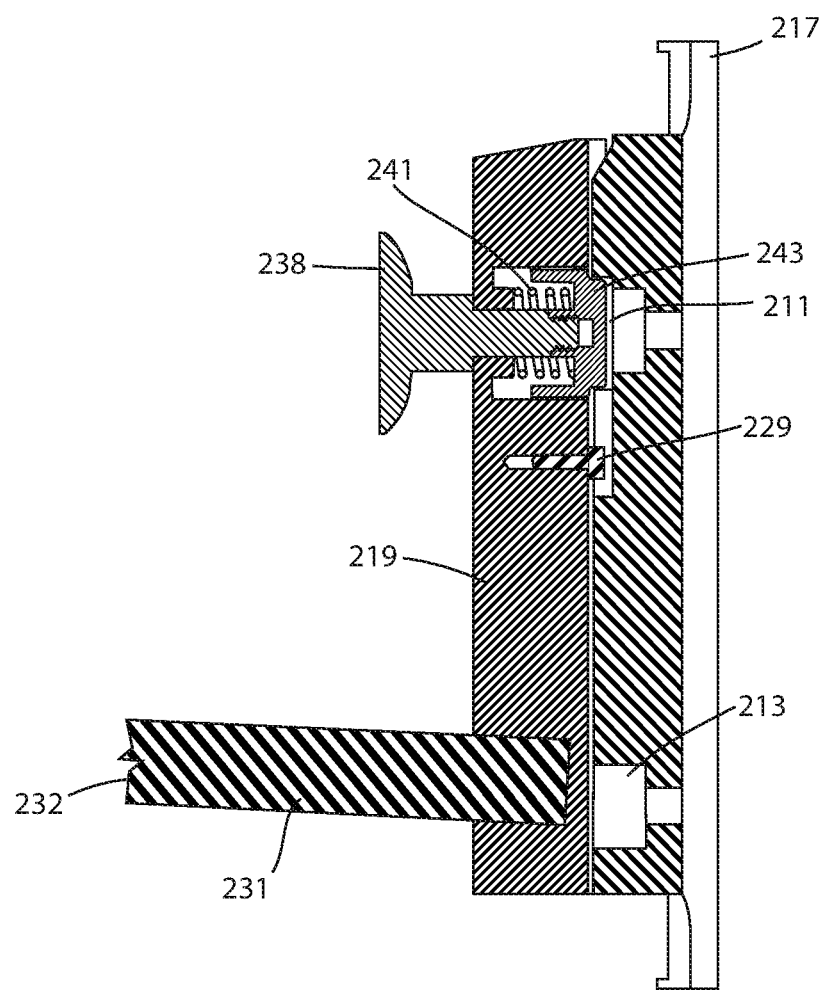
FIG. 46 is a side cross-sectional view of the upper bracket seen in FIG. 44 and FIG. 45.

FIG. 44 is a front exploded view illustrating an upper bracket assembly for use in tensioning a pole mounted flag/banner according to an alternative embodiment of the invention. Similarly, FIG. 45 is a rear exploded view of the upper bracket assembly shown in FIG. 44. FIG. 46 is a side cross-sectional view of the upper bracket as seen in FIG. 44 and FIG. 45.

With reference to each of FIG. 44, FIG. 45 and FIG. 46, the upper bracket assembly 200A/200B includes a base 201 that is substantially rectangular in shape with its upper end 203 configured with a dove tail taper. The base 201 is a rigid material formed having a raised guide member 205 extending longitudinally across its surface where a first guide channel 207 and second guide channel 209 as positioned the sides of the guide member 205. The first guide channel 207 and second guide channel 209 allow an upper mounting bracket to substantially wrap around a portion of the base 201 for holding the upper mounting bracket in a rigid position. The raised guide member 205 includes a plurality of apertures 211, 213. Both the first aperture 211 and second aperture 213 are counter-sunk for mounting the base 201 using a screw fastener or the like. An upper end of the aperture or hole is larger in diameter for allowing a screw head to remain below the top surface of the guide member 205. This prevents interference with the mounting bracket 219 as it is moved over the raised guide member 205. Further, the base 201 is attached to legs 215, 217. The legs 215, 217 form a concave surface 219 at the rear side the base 201 for matching the rounded contour of a light pole or other cylindrically configured upright structure. This facilitates easy mounting and insures the base 201 will remain in a fixed position unable to move vertically or rotate around the pole.

An upper mounting bracket 219 is configured so to releasably engage the base 201 while supporting a banner. The mounting bracket 219 includes a main channel 221 whose size and shape is configured to engage with the raised guide member 205. A plurality of winged channels 223, 225 works to direct and support the main channel 221 as it moves vertically across the raised guide member 205. A mounting fastener 229 and its screw head work as a stop for preventing the upper mounting bracket 219 from traveling too far downwardly toward the ground, along the main channel 221. Further, a banner carrying rod 231 is frictionally engaged within the support aperture 227 to hold the upper end of a banner in a horizontal position. As best seen in FIG. 46, the banner carrying rod 231 is positioned so that it is tilted at approximately in a range between zero to 10-degrees angle upwardly from ground. Configuring the banner carrying rod 231 with an upward slant or tilt prevents movement of the banner outwardly in windy conditions towards its open end 232 of the banner carrying rod 231. Thus, the tilted rod enables a banner to better maintain a fixed hanging position.

In order prevent the banner from moving too close to the mounting bracket 219, the banner carrying rod 231 includes a banner retention clip that is configured in a predetermined position at mounting end of the rod, i.e. that end supported by the mounting bracket 219. A banner securing clip or banner retention clip 233 snaps over both the banner and the banner carrying rod 231 to prevent the banner from sliding outboard on the banner rod and/or moving toward the upper mounting bracket 219.

Figure 44A:
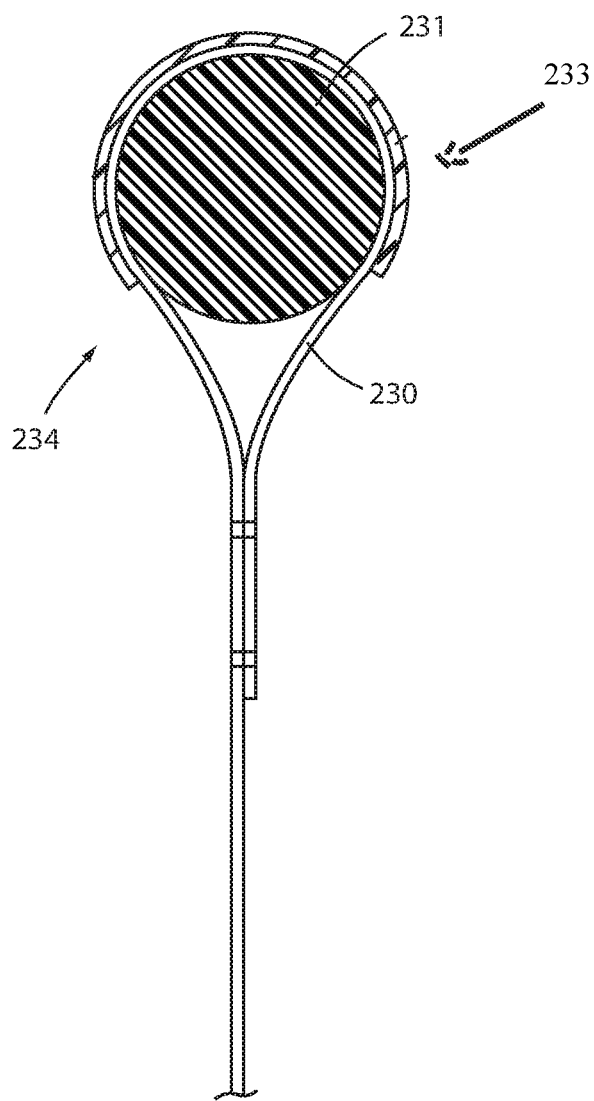
FIG. 44A is a magnified cross-sectional view showing a banner retention clip engaged over a banner and banner carrying rod according to an alternative embodiment of the invention.

FIG. 44A is a magnified cross-sectional view showing a banner retention clip engaged over a banner and banner carrying rod. The banner retention clip 233 works as a friction producing mechanism for enhancing friction on the surface of a support rod. The retention clip 233 is typically manufactured of a flexible or spring biased material such as polyethylene plastic or the like material. The banner retention clip 233 is sized and configured to include a slit or gap 234 longitudinally within its body so that it can be easily snapped and/or pushed over a portion of the banner carrying rod 231. Since the durometer of the clip material has a memory retaining shape, it will return to its original shape after being flexed or bent.

When the banner retention clip 233 is positioned over the banner 230 and banner carrying rod 231, it is frictionally engaged on the rod 231 so that it maintains the banner 230 is substantially fixed position. Thus, the banner retention clip 233 works to stop and/or prevent movement of the banner toward the mounting bracket 219. Anti-slip material 235 such as an anti-slip tape or the like, is positioned adjacent and outwardly of the banner retention clip 233. The anti-slip material 235 works to prevent lateral movement of the banner retention clip 233 toward the open end of the banner carrying rod 231.

Further, the upper mounting bracket 219 includes a retainer 237 for holding the upper mounting bracket 219 in a substantially fixed position when upper mounting bracket 219 engages with and over the base 201. The retainer 237 has a knob 238 and threaded shaft or stem that passes though mounting hole 239. A spring 241 and head 243 hold the retainer 227 to the upper mounting bracket 219 in compression. When the upper mounted bracket 219 is engaged with base 201 and, knob 238, a pulling force may be applied outwardly from the base 201 where the spring 241 provides a resilient force to this motion. The pulling force operates to retract the head 243 from aperture 211. This in-turns allows the raised guide member 205 to slide and be easily moved upwardly across both the main channel 221 and winged channels 223, 225. In use, the upper mounting bracket 219 generally remains in a fixed mounted position so to maintain a stationary banner position. However, the upper bracket assembly 200A/200B allows the upper bracket 219 to be easily removed from its base 201 by disengaging the head 243 from aperture 211. Although the head 243 is illustrated in a substantially round configuration, those skilled in the art will recognize a shaft-like pin or any shape of the head 243 can be used that will work to best hold the head 243 within its corresponding aperture 211.

Figure 47:
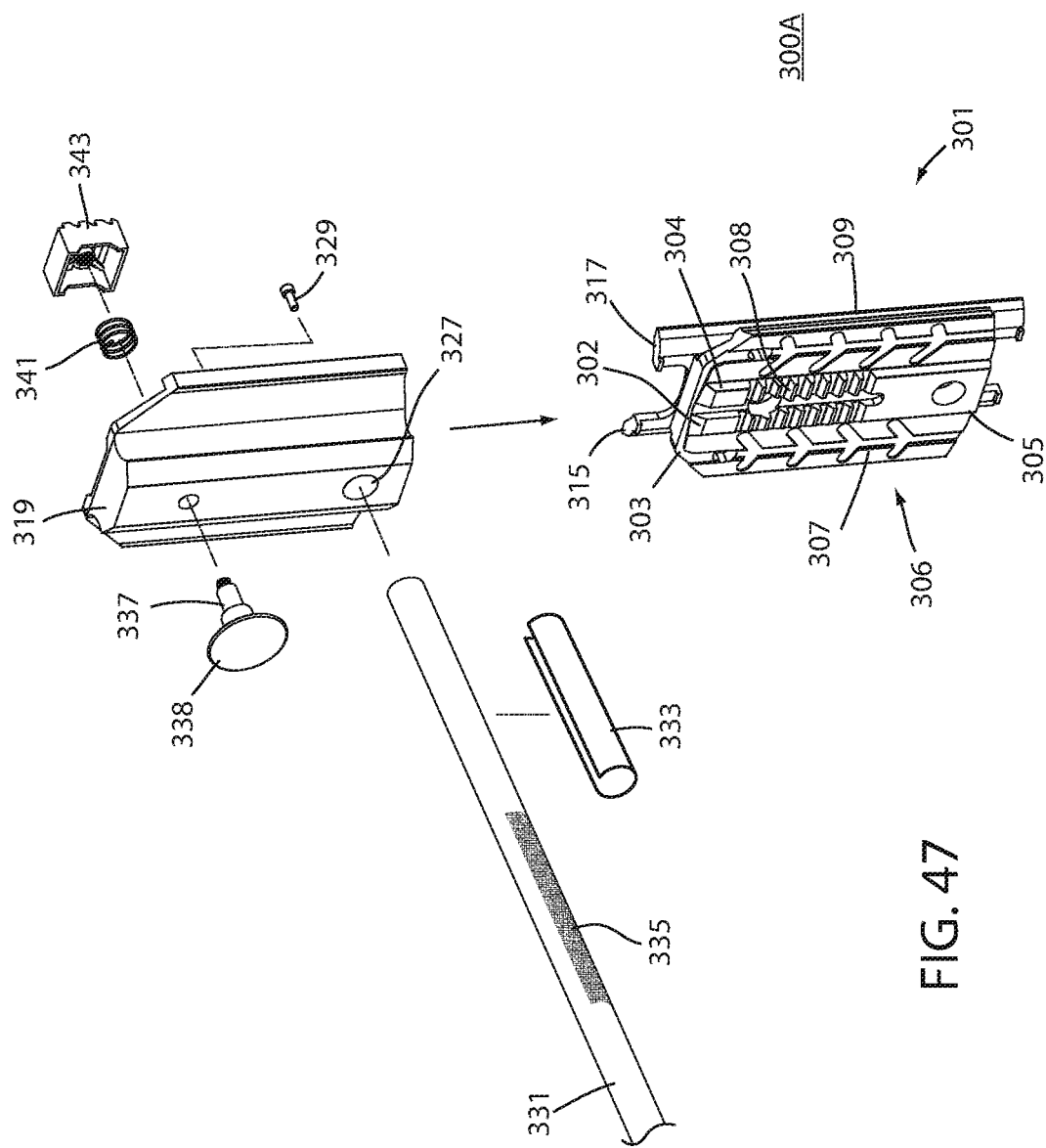
FIG. 47 is a front exploded view illustrating a lower adjustable bracket assembly for tensioning a pole mounted flag/banner.
Figure 48:
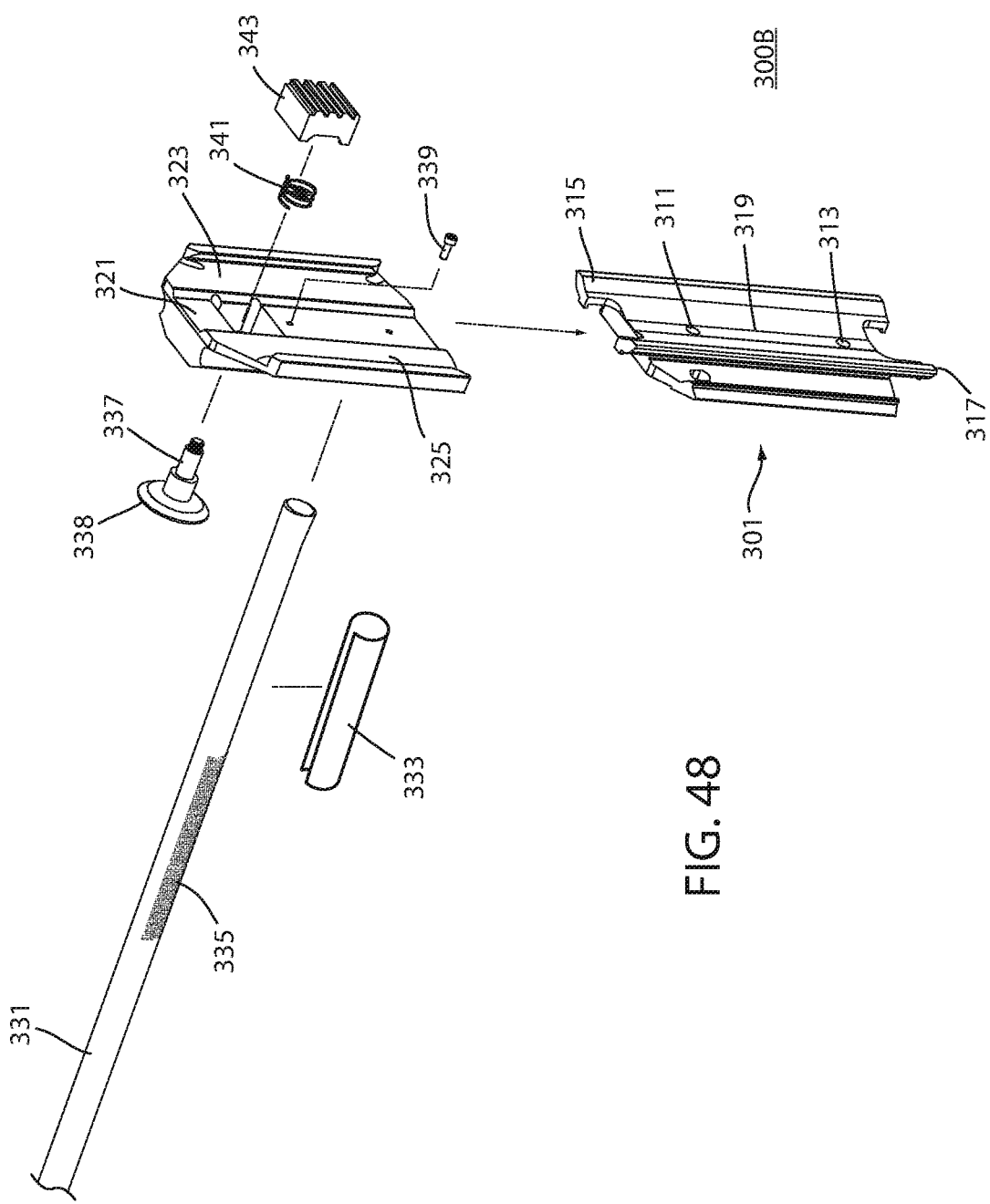
FIG. 48 is a rear exploded view of the lower adjustable bracket assembly shown in FIG. 47.
Figure 49:
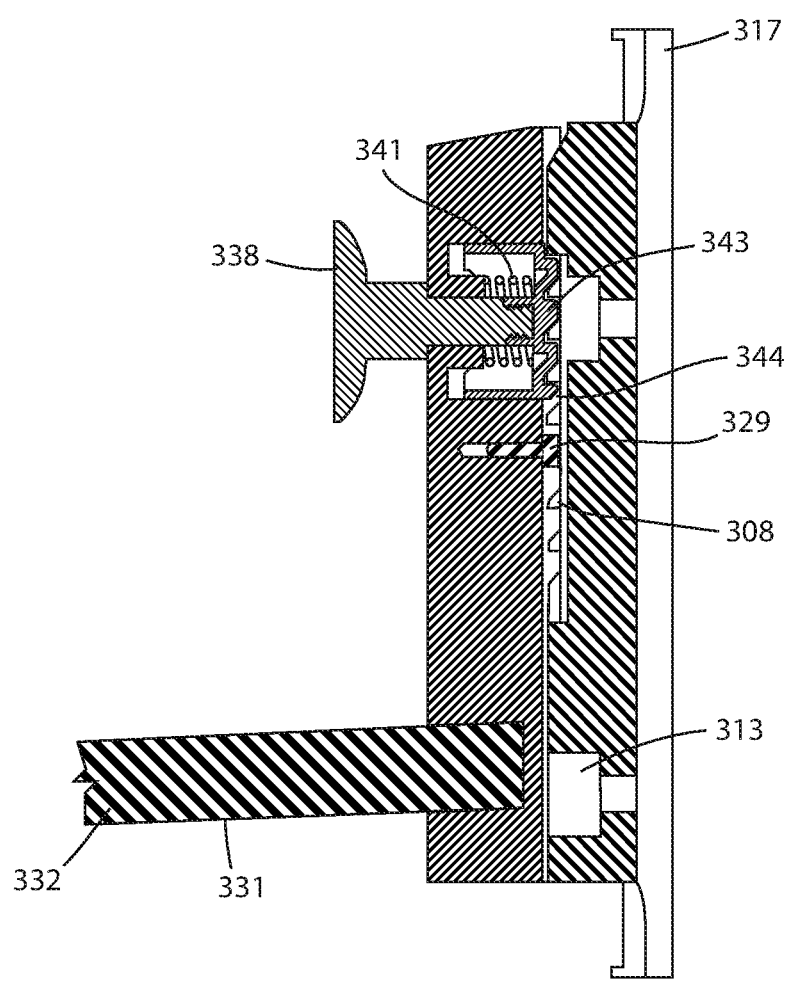
FIG. 49 is a side cross-sectional view of the lower adjustable bracket.

FIG. 47 is a front exploded view illustrating a lower adjustable bracket assembly used for tensioning a pole mounted flag/banner. FIG. 48 is a rear exploded view of the lower adjustable bracket assembly shown in FIG. 47. FIG. 49 is a side cross-sectional view of the lower adjustable bracket. As will be described herein, the lower bracket assembly 300A/300B differs from the upper bracket assembly 200A/200B in that it includes a ratcheting surface 306 on its base for allowing both locking and vertical movement of the lower adjustable mounting bracket in numerous positions on the base for easy adjustment of banner tension. Thus, in both the upper bracket assembly 200A/200B and the lower bracket assembly 300A/300B no manipulation of a head is required for locking the bracket in position. However, in the lower bracket assembly 300A/300B, no manipulation of a head is required for adjusting the tension of the banner in view of its use of a ratcheting surface. More specifically, the lower bracket assembly ratchets downwardly and can easily be positioned using a "J-hook" like fixture mounted on a telescoping pole tool also known as a "pole mounted tool" from the ground. If upward movement is required, the telescoping mounted pole tool can disengage a head from the ratcheting surface to move the lower bracket assembly upward towards the upper bracket assembly.

With reference to each of FIGS. 47, 48 and 49, the lower bracket assembly 300A/300B includes a base 301 the is substantially rectangular in shape. Its upper end 303 is configured with a dove tail tapered edge allowing an associated mounting bracket to be easily mounted thereon. The base 301 is rigid material typically formed of a plastic or metal. The base 301 includes a raised guide member 305 extending longitudinally across its center where a first guide channel 307 and second guide channel 309 are configured in the base 301 longitudinally at the sides of the guide member 305.

On the surface of the raised guide member 305 is a ratcheting surface 306. The ratcheting surface 306 is comprised of sequential engagement positions such as plurality of raised teeth 308 arranged in two rows with a gap therebetween. In one embodiment, each row includes seven teeth arranged vertically but also having a horizontal width or dimension. Those skilled in the art will recognize that different configurations of teeth are also possible. As best seen in FIG. 49, each of the teeth 308 have a substantially triangular cross-sectional shape. The upper surface has a slanted or angled surface while a lower surface of the triangle configured orthogonally to the surface of the base 301. Thus, the head 343 works as an engaging surface i.e. a similar configured surface to the ratcheting surface having a shape and contour substantially matching a shape and/or contour of the ratcheting surface 306.

In use, one surface of the tooth slopes downwardly allowing a ratcheting head 343 to move across each tooth ratcheting downwardly across its surface. Hence, any upward movement of the ratcheting head 343 is prevented without disengagement of the head 343 from the ratcheting surface 306. The first guide channel 307 and second guide channel 209 are configured to allow a lower mounting bracket to substantially wrap around a portion of the base 301 for holding the lower mounting bracket in a rigid position. Thus, the term "sequential engagement position" means the sequential manner in which the ratcheting head 343 is positioned on the surface of the ratcheting surface 306 i.e. how the ratcheting head 343 can be engaged with the ratcheting surface 306 in numerous positions to set the tension of the banner The raised guide member 305 further includes a plurality of stop guides 302, 304 and a plurality of apertures 311, 313. One stop guide is positioned above each row of teeth where the stop guides 302, 304 are configured above the ratcheting surface 306 requiring a ratcheting head to be raised before engaging the teeth below the stop guides 302, 304. Further, both the first aperture 311 and second aperture 313 in the base 301 are counter-sunk for mounting the base 301 using a screw fastener or the like. An upper end of the aperture or hole is larger in diameter for allowing a screw head to remain below the top surface of the guide member 305. This prevents interference with the mounting bracket 319 as it is moved over the raised guide member 305. Further, the base 301 is attached to legs 315, 317. The legs 315, 317 form a concave surface 319 at the rear side the base 301 for matching the rounded contour of a light pole or other cylindrically configured upright structure. The legs 315, 317 accommodate a hose and/or mounting clamp to hold the base to the upright structure. This facilitates easy mounting and insures the base 301 will remain in a fixed position.

A lower mounting bracket 319 is configured to engage and ratchet with the base 301 while supporting a banner. The mounting bracket 319 includes a main channel 321 whose size and shape is configured to engage with the raised guide member 305 and ratcheting surface 306. A plurality of winged channels 323, 325 works to direct and support the main channel 321 as it moves vertically across the ratcheting surface 306. A mounting fastener 329 and its screw head work as a butt or stop by limiting downward travel of the lower mounting bracket 319, along the main channel 321.

Further, a banner carrying rod 331 is frictionally engaged within a rod retention hole located in the support aperture 327 to hold the lower end of a banner in a substantially horizonal position. As best seen in FIG. 46, the banner carrying rod 331 is positioned so that it is tilted in a range between a zero and 10-degree opposing angle downwardly towards the ground. Configuring the banner carrying rod 331 at an opposing angle to banner carrying rod 231 i.e. one having a downward slant or tilt allows the banner to retain its tension during windy conditions. Thus, the downwardly tilted rod enables a banner to better maintain its fixed hanging position.

In order to prevent the banner from moving too close to the mounting bracket 319, the banner carrying rod 331 includes a banner retention clip 333 that works as a friction producing mechanism that can be positioned in a predetermined position at mounting end of the rod, i.e. that end supported by the mounting bracket 319. As described herein and in FIG. 44A, the banner retention clip 333 is manufactured of a flexible material, like plastic, that substantially retains its shape when flexed and bent. The banner retention clip 333 is sized and configured to include a slit or gap longitudinally along body so that it can be easily snapped and/or fastened over both the banner and the banner carrying rod 331. When the banner retention clip 333 is positioned over the banner carrying rod 331, it maintains the banner in a substantially fixed position on the rod while stopping and preventing movement of the banner toward the mounting bracket 319. Anti-slip material 335 such as an abrasive tape or the like, is positioned adjacent and outwardly of the banner retention clip 333 and works to prevent lateral movement of the banner retention clip 333 toward the open end of the banner carrying rod 231. The abrasive or anti-slip material 335 may be fastened to the banner carrying rod 331 with adhesive glue, sticky tape or could be sprayed on the banner rod.

Finally, the lower mounting bracket 319 includes a retainer 337 for holding a ratcheting head 343 in a substantially fixed position when the lower mounting bracket 319 engages with and over the base 301. The ratcheting head 343 includes a plurality of raised teeth 344 the mate with teeth 308 on ratcheting surface 306. In one embodiment, the ratcheting head 343 may include five (5) teeth. The retainer 337 has a knob 238 and threaded shaft or stem that passes though mounting hole 339. A spring 341 and ratcheting head 343 hold the retainer 327 to the lower mounting bracket 319 in compression. When the lower mounted bracket 319 is engaged with the ratcheting surface 306, the knob 338 can be pulled outwardly from the base 301, such that the spring 341 provides a resilient force. When the ratcheting head 343 is pulled downwardly on the ratcheting surface 306, using a J hook or the like, this ratcheting type motion enables for the easy adjustment of the vertical position of the lower mounting bracket 319 in relation to the upper mounting bracket 219. In use, the lower mounting bracket 319 is easily moveable using a pole from the ground. Hence, the configuration of the lower bracket assembly 300A/300B allows the lower bracket 339 to also be easily removed from its base 301 by downwardly pulling the ratcheting head 343 across the ratcheting surface 306. Since the upper portion of the banner is fixed in position, this enables an installer to set a desired tension on the banner. Although the ratcheting head 311 is illustrated in a substantially square configuration, those skilled in the art will recognize that any shape may be used that will work to best hold the head 311 within its corresponding aperture 311 while still working to engage and mate with the ratcheting surface 306.

Figure 51:
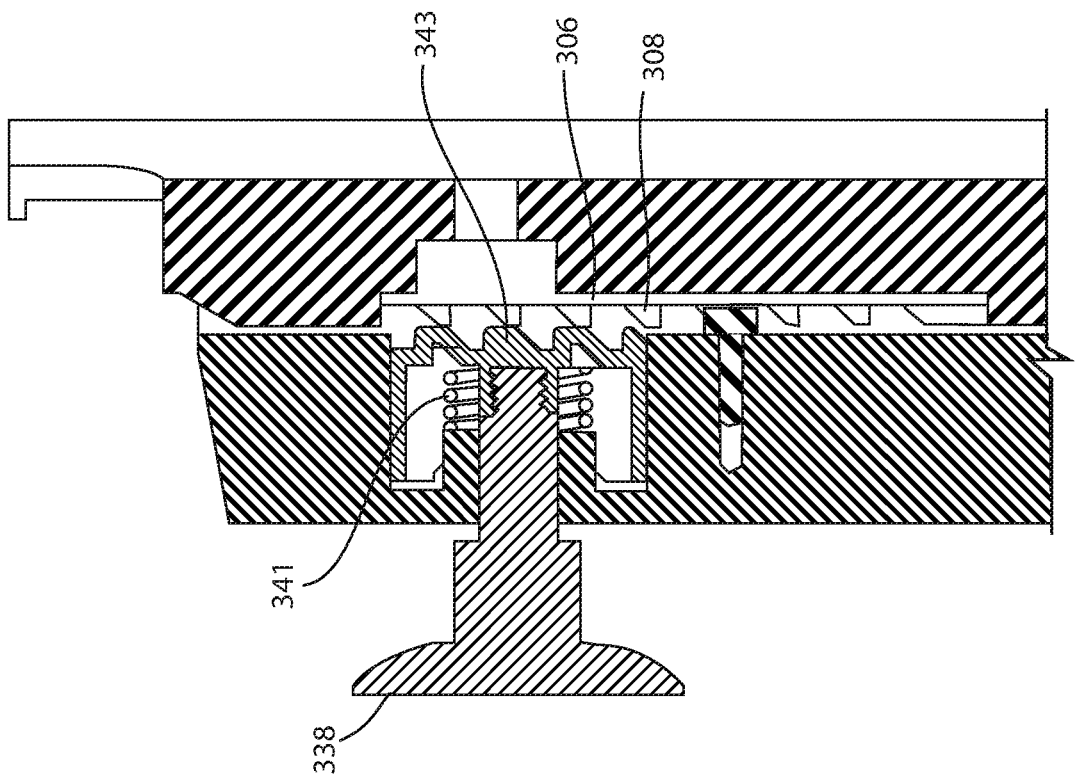
FIG. 51 illustrates a magnified cross-sectional view of the ratcheting head disengaged from ratcheting surface.
Figure 50:
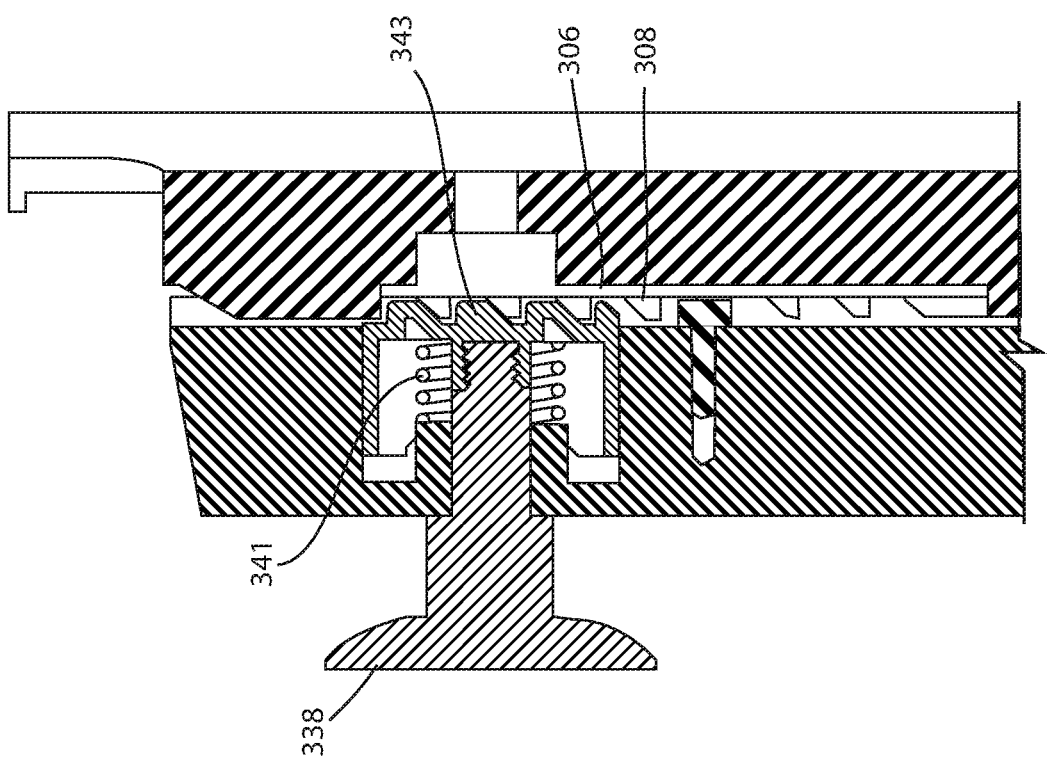
FIG. 50 illustrates a magnified cross-sectional view of the ratcheting head engaged with the ratcheting surface.

FIG. 50 illustrates a magnified cross-sectional view of the ratcheting head 343 engaged with the ratcheting surface 306. FIG. 51 illustrates a magnified cross-sectional view of the ratcheting head 343 disengaged from ratcheting surface 306. As described herein, because of the triangular cross-sectional surface shape of the teeth 308, the ratcheting head 343 and its contoured surface, is only able to move in a downward direction toward the ground. This enables the installer to easily tension a banner from the ground by pulling it downwardly after the banner is secured to the banner rod 232 associated with the upper mounting bracket 219.

Figure 52:
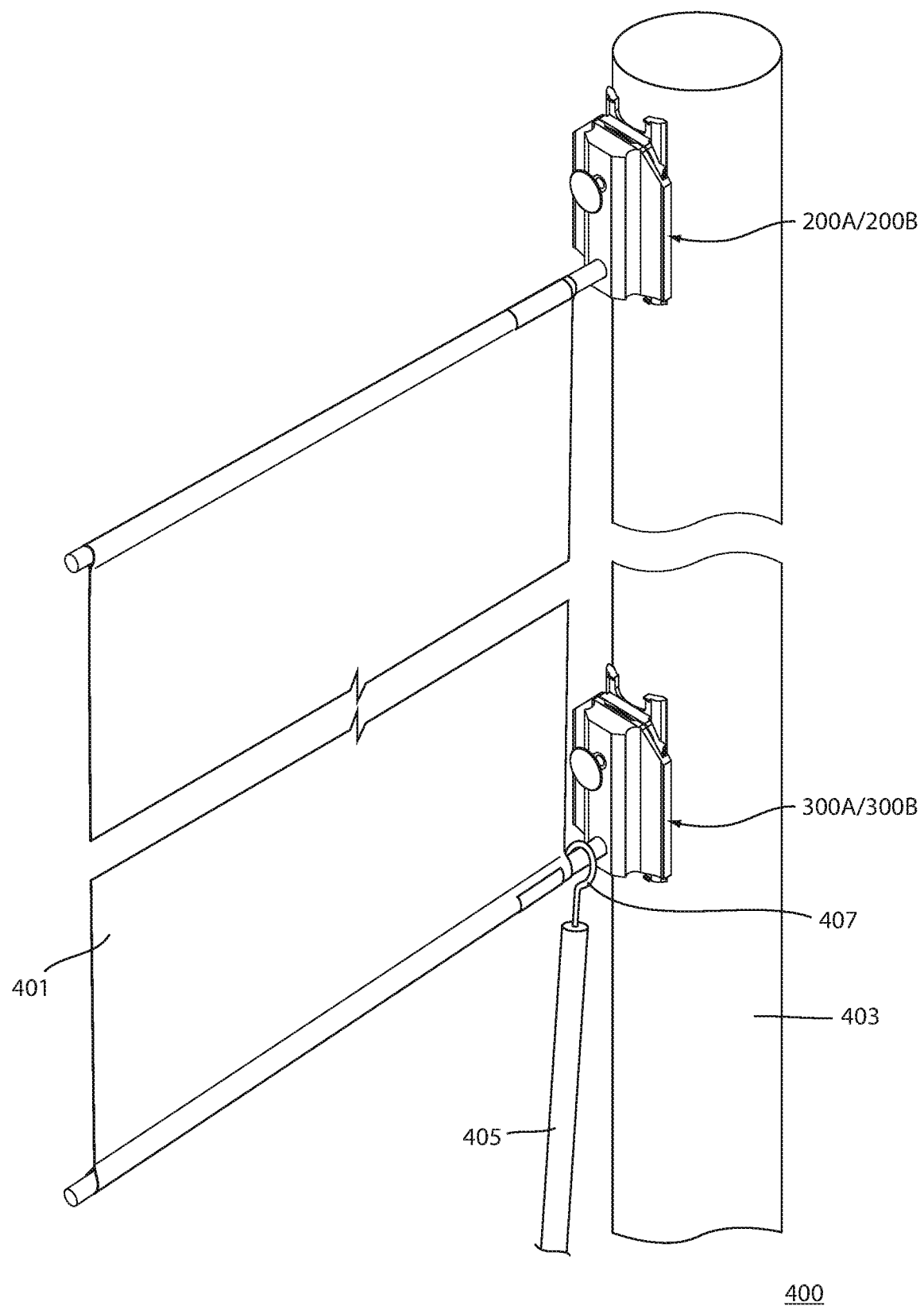
FIG. 52 is an elevational view of the upper bracket and the lower adjustable bracket supporting a banner.

Finally, FIG. 52 is an elevational view of the upper adjustable bracket and the lower adjustable bracket supporting a banner. The banner assembly 400 includes the upper adjustable bracket assembly 200A/200B and lower adjustable bracket assembly 300A/300B attached supporting a banner 401 and both mounted to a upright structure 402. A telescoping pole mounted tool 405 having a hook 407 can be used for easily adjusting the lower adjustable bracket assembly 300A/300B from the ground. Those skilled in the art will also recognize that the configuration as shown in FIG. 52 could be reversed such that the upper bracket assembly includes the ratcheting surface that is adjusted upwardly and the lower bracketing assembly is fixed in position. Further, still another embodiment could include both the upper bracket and lower bracket both including the ratcheting surfaces so they both may be vertically adjusted in a manner to oppose one another.

Thus, embodiments of the present invention are directed to a banner mounting assembly and method where a first base is fixedly attached to an upright structure where a first mounting bracket attaches to the first base for holding an upper end of a banner. A second base is fixedly to the upright structure where a second mounting bracket attaches to the second base and is configured to releasably engage the second base while supporting a lower end of the banner. The second base forms an adjustable mounting assembly where a ratcheting surface that slideably engages with a ratcheting head in the second mounting bracket for enabling the second mounting bracket to be vertically adjusted in relation to first mounting bracket for providing an adjustable tension on the banner. It is to be understood that variations and modifications can be made on the aforementioned structure without departing from the concepts of the present invention, and further it is to be understood that such concepts are intended to be covered by the following claims unless these claims by their language expressly state otherwise.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A friction producing mechanism for use in supporting a banner comprising:
    an adjustable support rod fastened to an adjustable bracket;
    a retention clip having a slotted gap; where the retention clip is secured to both a banner and the banner support rod for limiting movement of a banner on the adjustable support rod; and
    wherein the adjustable bracket is adjusted from ground level using an extendible pole tool.

2. A friction producing mechanism as in claim 1, further comprising:
    a slip limiting surface; and
    wherein the slip limiting surface is attached to a portion of the banner support rod for limiting movement of the banner and retention clip.

3. A friction producing mechanism as in claim 1, wherein the retention clip is manufactured of a material that retains its original shape when flexed.

4. A friction producing mechanism as in claim 1, wherein the limited slip surface is adhered to the surface of the banner support rod.

5. A friction producing mechanism as in claim 1, wherein the retention clip is positioned over the banner and the banner support rod at ground level prior to the adjustable bracket.

6. A friction producing mechanism for use with a hanging banner comprising:
    a banner support rod attached to an adjustable support bracket for holding the banner;
    a retention clip fastened over both the banner and the banner support rod for limiting movement of a banner on the banner support rod;
    a slip limiting surface configured on a portion of the banner support rod for limiting movement of the banner and retention clip;
    wherein the adjustable support bracket is adjusted from ground level using an extendible pole tool.

7. A friction producing mechanism as in claim 6, wherein the retention clip is configured into a tubular body.

8. A friction producing mechanism as in claim 7, wherein the tubular body includes a longitudinal slot for allowing the retention clip to frictionally engage over a portion of the banner support rod.

9. A friction producing mechanism as in claim 6, wherein the retention clip is manufactured of a shape retaining plastic.

10. A friction producing mechanism as in claim 6, wherein the slip limiting surface is adhered to a portion of the banner support rod.

11. A friction producing mechanism as in claim 10, wherein the retention clip is positioned over the banner and the banner support rod at ground level prior to installation of the banner.

12. A method for forming a friction producing mechanism for use with a hanging banner comprising:
    configuring a retention clip having a slotted gap in its body;
    fastening the retention clip over the banner and a banner support rod for limiting movement of a banner on the support rod; and
    adjusting the tension of the banner support rod from the ground using an extendable pole tool.

13. A method for forming a friction producing mechanism as in claim 12, further comprising the step of:
    forming retention clip into a tubular body where slotted gap extends longitudinally though a portion of the body.

14. A method for forming a banner retention assembly as in claims 12, further comprising the step of:
    configuring a slip limiting surface to a portion of the banner support rod for limiting movement of the banner and the retention clip.

15. A method for forming a friction producing mechanism as claim 12, further comprising the step of:
    manufacturing the retention clip using a material that substantially retains its shape.

16. A method for forming a friction producing mechanism as in claim 12, further comprising the step of:
    adhering the slip limiting surface to a portion of the banner support rod so that it does not completely wrap around its surface.

17. A method for forming a friction producing mechanism as in claim 12, further comprising the steps of:
    fastening the banner support rod to an adjustable bracket; and
    adjusting position of banner support rod from ground level.

18. A method for forming a friction producing mechanism as in claim 12, further comprising the step of:
    positioning the retention clip over the banner and the banner support rod at ground level prior to installation of the banner.

* * * * *